United States Patent
Jiang et al.

(10) Patent No.: US 12,476,712 B2
(45) Date of Patent: Nov. 18, 2025

(54) METHOD AND DEVICE FOR MONITORING GENERALIZED OPTICAL SIGNAL-TO-NOISE RATIO, COHERENT RECEIVER AND NETWORK APPARATUS

(71) Applicant: Huawei Technologies Co., Ltd., Shenzhen (CN)

(72) Inventors: Zhiping Jiang, Kanata (CA); Choloong Hahn, Nepean (CA); Junho Chang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 219 days.

(21) Appl. No.: 18/464,825

(22) Filed: Sep. 11, 2023

(65) Prior Publication Data

US 2025/0088283 A1    Mar. 13, 2025

Related U.S. Application Data

(60) Provisional application No. 63/581,346, filed on Sep. 8, 2023.

(51) Int. Cl.
*H04B 10/07* (2013.01)
*H04B 10/2543* (2013.01)
(Continued)

(52) U.S. Cl.
CPC ......... *H04B 10/58* (2013.01); *H04B 10/2543* (2013.01); *H04B 10/6163* (2013.01);
(Continued)

(58) Field of Classification Search
CPC ............ H04B 10/58; H04B 10/2543; H04B 10/6163; H04B 10/07; H04B 10/079;
(Continued)

(56) References Cited

U.S. PATENT DOCUMENTS 8,781,317 B1 * 7/2014 Roberts ............... H04B 10/073
398/25
11,405,104 B1 * 8/2022 Hahn ................ H04B 10/0791
(Continued)

OTHER PUBLICATIONS

Cho, Generalized optical signal-to-noise ratio monitoring using a convolutional neural network, Apr. 2023, Optics Letters, All Document. (Year: 2023).*

(Continued)

*Primary Examiner* — Dibson J Sanchez
(74) *Attorney, Agent, or Firm* — Slater Matsil, LLP

(57) ABSTRACT

A method for monitoring generalized optical signal-to-noise ratio (gOSNR) is provided, which is applied to monitoring of an optical signal received by a coherent receiver through a fiber link. The method includes: obtaining a first received waveform; obtaining a signal part of the first received waveform; obtaining a noise part of the first received waveform according to the signal part and the first received waveform; obtaining a first correlation between the noise part and a first template at a predetermined location on the fiber link, the first correlation indicating a signal power at the predetermined location; obtaining a second correlation between the noise part and a second template at the predetermined location on the fiber link, the second correlation indicating a signal power and noise power at the predetermined location; and obtaining gOSNR at the predetermined location according to the first correlation and the second correlation.

20 Claims, 10 Drawing Sheets

(51) Int. Cl.
*H04B 10/58* (2013.01)
*H04B 10/61* (2013.01)
*H04B 10/079* (2013.01)
*H04B 10/60* (2013.01)

(52) U.S. Cl.
CPC ............ *H04B 10/07* (2013.01); *H04B 10/079* (2013.01); *H04B 10/0795* (2013.01); *H04B 10/07953* (2013.01); *H04B 10/60* (2013.01); *H04B 10/61* (2013.01); *H04B 10/616* (2013.01)

(58) Field of Classification Search
CPC .......... H04B 10/0795; H04B 10/07953; H04B 10/60; H04B 10/61; H04B 10/616
USPC ....................... 398/9–38, 182–201, 202–214
See application file for complete search history.

(56) References Cited

U.S. PATENT DOCUMENTS

| | | | | |
|---|---|---|---|---|
| 11,595,125 | B2* | 2/2023 | He ................... | H04B 10/07953 |
| 11,968,033 | B2* | 4/2024 | Yamauchi ......... | H04J 14/02216 |
| 2012/0201533 | A1* | 8/2012 | Gariepy ........... | H04B 10/07953 398/26 |
| 2015/0304035 | A1* | 10/2015 | Nijhof ................ | H04B 10/0793 398/26 |
| 2016/0269110 | A1* | 9/2016 | Dahan ................ | H04B 10/60 |
| 2018/0102840 | A1* | 4/2018 | Jiang ................ | H04B 1/7087 |
| 2018/0138974 | A1* | 5/2018 | Heismann ........ | H04B 10/07955 |
| 2018/0269968 | A1* | 9/2018 | Zhuge ............... | H04B 10/07953 |
| 2019/0215073 | A1* | 7/2019 | Schmogrow ....... | H04B 10/0793 |
| 2019/0305845 | A1* | 10/2019 | Cyr ................... | H04B 10/07955 |
| 2020/0112367 | A1* | 4/2020 | Huang ............... | H04L 27/3405 |
| 2020/0412448 | A1* | 12/2020 | Flettner ............ | H04B 10/07953 |
| 2022/0109509 | A1* | 4/2022 | Tibuleac ............ | H04B 10/2939 |
| 2022/0343176 | A1* | 10/2022 | Schmogrow ......... | H04L 41/145 |
| 2022/0385390 | A1* | 12/2022 | Ainaka ................ | H04J 14/021 |
| 2023/0118684 | A1* | 4/2023 | Jiang ............... | H04B 10/07953 398/25 |
| 2023/0198615 | A1* | 6/2023 | Dou ................... | H04B 10/0797 398/38 |
| 2023/0396332 | A1* | 12/2023 | Eto .................... | G01M 11/3127 |
| 2025/0132829 | A1* | 4/2025 | Sone .................. | H04B 10/2543 |

OTHER PUBLICATIONS

Hahn et al, Monitoring of Generalized Optical Signal-to-Noise Ratio using In-Band Spectral Correlation, Dec. 2022, ECOC, All Document. (Year: 2022).*

Rapp et al, Capturing Nonlinear Signal Distortions by the Spectral Correlation Method, Jul. 2021, OFC, All Document. (Year: 2021).*

Tanimura et al, Fiber-Longitudinal Anomaly Position Identification Over Multi-Span Transmission Link, May 2020, JOLWT, All Document. (Year: 2020).*

Eto, M., et al., "Location-resolved PDL Monitoring with Rx-side Digital Signal Processing in Multi-span Optical Transmission System", 2022 Optical Fiber Communications Conference and Exhibition (OFC), Mar. 6-10, 2022, 3 Pages.

Gleb, S., et al., "Fiber Link Anomaly Detection and Estimation Based on Signal Nonlinearity", 2021 European Conference on Optical Communication (ECOC), Sep. 13-16, 2021, 4 Pages.

Hahn, C., et al., "Localization of Reflection Induced Multi-Path-Interference Over Multi-Span Transmission Link by Receiver-side Digital Signal Processing", 2022 Optical Fiber Communications Conference and Exhibition (OFC), Mar. 6-10, 2022, 3 Pages.

Sasai, T., et al., "Revealing Raman-amplified Power Profile and Raman Gain Spectra with Digital Backpropagation", 2021 Optical Fiber Communications Conference and Exhibition (OFC), Jun. 6-10, 2021, 3 Pages.

Sasai, T., et al., "Simultaneous Detection of Anomaly Points and Fiber types in Multi-span Transmission Links Only by Receiver-side Digital Signal Processing", 2020 Optical Fiber Communications Conference and Exhibition (OFC), Mar. 8-12, 2020, 3 Pages.

Tanimura, T., et al., "Experimental Demonstration of a Coherent Receiver that Visualizes Longitudinal Signal Power Profile over Multiple Spans out of Its Incoming Signal", 45th European Conference on Optical Communication (ECOC 2019), Sep. 22-26, 2019, 4 Pages.

* cited by examiner

METHOD AND DEVICE FOR MONITORING GENERALIZED OPTICAL SIGNAL-TO-NOISE RATIO, COHERENT RECEIVER AND NETWORK APPARATUS

CROSS-REFERENCE TO RELATED APPLICATIONS

This application claims the benefit of U.S. Provisional Application 63/581,346 filed on Sep. 8, 2023, entitled "METHOD AND DEVICE FOR MONITORING GENERALIZED OPTICAL SIGNAL-TO-NOISE RATIO, COHERENT RECEIVER AND NETWORK APPARATUS," application of which is hereby incorporated herein by reference in its entirety.

TECHNICAL FIELD

The present disclosure relates to the field of optical communications, and in particular, to a method for monitoring generalized optical signal-to-noise ratio, a device for monitoring generalized optical signal-to-noise ratio, a coherent receiver and a network apparatus.

BACKGROUND

In optical networks, optical signal-to-noise ratio (OSNR) is a key indicator for measuring performance of an optical signal. OSNR directly affects bit error rate (BER) of a communication link. To ensure the normal operation of the communication link, the BER of the communication link needs to be lower than a certain threshold. That is, the OSNR needs to be higher than a certain threshold. However, the OSNR only accounts the quality degradation due to amplified spontaneous emission (ASE) noise. Other noises such as self-phase modulation (SPM) noise and cross-phase modulation (XPM) noise due to Kerr nonlinear effect, and transceiver (TRx) noise are not accounted, which are also directly affects the BER. Therefore, generalized OSNR (gOSNR) has been defined as a general quality indicator that accounts both ASE and nonlinear noises and other noises. Therefore, it is very important to obtain the gOSNR.

SUMMARY

Embodiments of the present disclosure provide a method for monitoring generalized optical signal-to-noise ratio (gOSNR), a device for monitoring gOSNR, a coherent receiver and a network apparatus, which are used to solve the problem of low location flexibility of gOSNR monitoring in optical networks.

To achieve the above objective, the following technical solutions are adopted in the present disclosure.

In a first aspect, a method for monitoring gOSNR is provided, which is applied to monitoring of an optical signal received by a coherent receiver through a fiber link. The method includes: obtaining a first received waveform, the first received waveform including a signal part and a noise part; obtaining the signal part of the first received waveform; obtaining the noise part of the first received waveform according to the signal part of the first received waveform and the first received waveform; obtaining a first correlation between the noise part and a first template at a predetermined location on the fiber link, the first correlation indicating a signal power at the predetermined location; obtaining a second correlation between the noise part and a second template at the predetermined location on the fiber link, the second correlation indicating a signal power and noise power at the predetermined location; and obtaining gOSNR at the predetermined location according to the first correlation and the second correlation.

In some embodiments, obtaining the first correlation between the noise part and the first template at the predetermined location on the fiber link includes: obtaining the first template according to the signal part of the first received waveform, the first template being used for representing a nonlinear noise by a signal part at the predetermined location, and the signal part at the predetermined location is obtained by the signal part of the first received waveform; and obtaining the first correlation by performing correlation calculation on the noise part and the first template.

In some embodiments, for a single-polarization optical signal, the first template is represented as: $\Delta u_{z_i}^s(\zeta,t) = -j\hat{D}_{z_i,\zeta}\hat{N}_{eRP}\hat{D}_{0,z_i}u(0, t) = \hat{D}_{z_i,\zeta}[-j(|u(z_i,t)|^2-2)u(z_i,t)]$; for a dual-polarization optical signal, the first template includes a first sub-template of x-polarization and a second sub-template of y-polarization; the first sub-template is represented as: $\Delta u_{x,z_i}^s(\zeta,t) = \hat{D}_{z_i,\zeta}[-j(|u_x(z_i,t)|^2+|u_y(z_i,t)|^2-3)u_x(z_i,t)]$; the second sub-template is represented as: $\Delta u_{y,z_i}^s(\zeta,t) = \hat{D}_{z_i,\zeta}[-j(|u_x(z_i,t)|^2+|u_y(z_i,t)|^2-3)u_y(z_i,t)]$. $\hat{D}_{z_i,\zeta}$ represents chromatic dispersion (CD) from the predetermined location $z_i$ to a location $\zeta$ on the fiber link, and the location $\zeta$ is any location on the fiber link that matches with the first received waveform; $\hat{D}_{0,z_i}$ represents CD from the location 0 to the predetermined location $z_i$ on the fiber link; $u(0,t)$ represents a normalized linear signal waveform at the location 0, and $u(z_i,t)$ represents the signal part at the predetermined location $z_i$; $\hat{N}_{eRP}$ represents a nonlinear operator based on an enhanced regular perturbation (eRP) model; j is an imaginary unit of a complex number; and S indicates that the first template is generated according to $u(0,t)$.

In some examples, $\zeta=0$ in a case that the first received waveform is a CD compensated waveform, and $\zeta=L$ is in a case that the first received waveform is a CD uncompensated waveform. The location 0 is a receiving end of the fiber link, the location L is an outputting end of the fiber link.

In some embodiments, the first correlation is represented as: $CR(\Delta E(\zeta,t),\Delta u_{z_i}^s(\zeta,t)) = \gamma P(z_i)L_{CR}(z_i)$. $CR(A(t),B(t)) \equiv \langle A(t)B^*(t)\rangle$, which represents correlation calculation between $A(t)$ and $B(t)$; $\langle \cdot \rangle$ represents time average operation; $\Delta E(\zeta,t)$ represents the noise part; $\gamma$ represents a nonlinear coefficient; $L_{CR}(z_i)$ is an effective correlation length, $$L_{CR}(z_i) \equiv \int_0^L \frac{P(z)}{P(z_i)} g(z_i - z)dz; g(z_i - z) \equiv CR(\Delta u_{z_i}^S(\zeta, t), \Delta u_z^S(\zeta, t))$$

represents a spatial response function; $P(z_i)$ represents the signal power at the predetermined location $z_i$; $P(z)$ represents a signal power at a location z, and the location z is any location on the fiber link.

In some embodiments, obtaining the second correlation between the noise part and the second template at the predetermined location on the fiber link includes: obtaining the second template according to the first received waveform, the second template being used for representing a nonlinear noise by a signal and noise waveform at the predetermined location, and the signal and noise waveform at the predetermined location is obtained by the first received waveform; and obtaining the second correlation by performing correlation calculation on the noise part and the second template.

In some embodiments, the second template is represented as: $\Delta u_{z_i}^{SN}(\zeta,t)=-j\hat{D}_{z_i,\zeta}\hat{N}_{eRP}\hat{D}_{0,z_i}E_{tot}(0,t)=\hat{D}_{z_i,\zeta}[-j(|E_{tot}(z_i,t)|^2-2)E_{tot}(z_i,t)]$. $\hat{D}_{z_i,\zeta}$ represents chromatic dispersion (CD) from the predetermined location $z_i$ to a location $\zeta$ on the fiber link, and the location $\zeta$ is any location on the fiber link that matches with the first received waveform; $\hat{D}_{0,z_i}$ represents CD from location 0 to the predetermined location $z_i$ on the fiber link; $E_{tot}(0,t)$ represents a signal and noise waveform at the location 0, and $E_{tot}(z_i,t)$ represents the signal and noise waveform at the predetermined location $z_i$; $\hat{N}_{eRP}$ represents a nonlinear operator based on an enhanced regular perturbation (eRP) model; j is an imaginary unit of a complex number; and SN indicates that the second template is generated according to $E_{tot}(0,t)$.

In some examples, $\zeta=0$ in a case that the first received waveform is a CD compensated waveform, and $\zeta=L$ in a case that the first received waveform is a CD uncompensated waveform. The location 0 is a receiving end of the fiber link, the location L is an outputting end of the fiber link.

In some embodiments, the second correlation is represented as: $CR(\Delta E(\zeta,t),\Delta u_{z_i}^{SN}(\zeta,t)=\gamma(P(z_i)+N(z_i))L_{CR}(z_i)$. $CR(A(t),B(t))\equiv\langle A(t)B^*(t)\rangle$, which represents correlation calculation between A(t) and B(t); $\langle\cdot\rangle$ represents time average operation; $\Delta E(\zeta,t)$ represents the noise part; $\gamma$ represents a nonlinear coefficient; $L_{CR}(z_i)$ is an effective correlation length, $$L_{CR}(z_i) \equiv \int_0^L \frac{P(z)}{P(z_i)} g(z_i-z)dz; g(z_i-z) \equiv CR\left(\Delta u_{z_i}^{SN}(\zeta,t),\Delta u_z^{SN}(\zeta,t)\right)$$

represents a spatial response function; P(z) represents a signal power at a location z, and the location z is any location on the fiber link; $P(z_i)$ represents the signal power at the predetermined location $z_i$, and $N(z_i)$ represents the noise power at the predetermined location $z_i$. The noise power, $N(z_i)$, includes noises such as amplified spontaneous emission (ASE) noise, self-phase modulation (SPM) noise, cross-phase modulation (XPM) noise, transceiver (TRx) noise, and etc.

In some embodiments, the method further includes: traversing each location on the fiber link to obtain an gOSNR curve of the fiber link, the gOSNR curve taking locations on the fiber link as vertical axis, and taking gOSNRs as horizontal axis.

In some embodiments, obtaining the first received waveform includes: receiving a signal waveform sent by the coherent receiver as the first received waveform; or receiving a second received waveform sent by the coherent receiver; and performing chromatic dispersion (CD) compensation on the second received waveform to obtain the first received waveform.

In a second aspect, a device for monitoring gOSNR is provided, which is applied to monitoring of an optical signal received by a coherent receiver through a fiber link. The device includes an interface circuit and a processing circuit. The interface circuit is used to obtain a first received waveform, and the first received waveform includes a signal part and a noise part. The processing circuit is coupled to the interface circuit, and the processing circuit is used to: obtain the signal part of the first received waveform; obtain the noise part of the first received waveform according to the signal part of the first received waveform and the first received waveform; obtain a first correlation between the noise part and a first template at a predetermined location on the fiber link, the first correlation indicating a signal power at the predetermined location; obtain a second correlation between the noise part and a second template at the predetermined location on the fiber link, the second correlation indicating a signal power and noise power at the predetermined location; and obtain gOSNR at the predetermined location according to the first correlation and the second correlation.

In some embodiments, the processing circuit is used to: obtain the first template according to the signal part of the first received waveform, the first template being used for representing a nonlinear noise by a signal part at the predetermined location, and the signal part at the predetermined location being obtained by the signal part of the first received waveform; and obtain the first correlation by performing correlation calculation on the noise part and the first template.

In some embodiments, for a single-polarization optical signal, the first template is represented as: $\Delta u_{z_i}^S(\zeta,t)=-j\hat{D}_{z_i,\zeta}\hat{N}_{eRP}\hat{D}_{0,z_i}u(0,t)=\hat{D}_{z_i,\zeta}[-j(|u(z_i,t)|^2-2)u(z_i,t)]$; for a dual-polarization optical signal, the first template includes a first sub-template of x-polarization and a second sub-template of y-polarization; the first sub-template is represented as: $\Delta u_{x,z_i}^S(\zeta,t)=\hat{D}_{z_i,\zeta}[-j(|u_x(z_i,t)|^2+|u_y(z_i,t)|^2-3)u_x(z_i,t)]$; the second sub-template is represented as: $\Delta u_{y,z_i}^S(\zeta,t)=\hat{D}_{z_i,\zeta}[-j(|u_x(z_i,t)|^2+|u_y(z_i,t)|^2-3)u_y(z_i,t)]$. $\hat{D}_{z_i,\zeta}$ represents chromatic dispersion (CD) from the predetermined location $z_i$ to a location $\zeta$ on the fiber link, and the location $\zeta$ is any location on the fiber link that matches with the first received waveform; $\hat{D}_{0,z_i}$ represents CD from the location 0 to the predetermined location $z_i$ on the fiber link; u(0,t) represents a normalized linear signal waveform at the location 0, and $u(z_i,t)$ represents the signal part at the predetermined location $z_i$; $\hat{N}_{eRP}$ represents a nonlinear operator based on an enhanced regular perturbation (eRP) model; j is an imaginary unit of a complex number; and S indicates that the first template is generated according to u(0,t).

In some examples, $\zeta=0$ in a case that the first received waveform is a CD compensated waveform, and $\zeta=L$ is in a case that the first received waveform is a CD uncompensated waveform. The location 0 is a receiving end of the fiber link, the location L is an outputting end of the fiber link.

In some embodiments, the first correlation is represented as: $CR(\Delta E(\zeta,t),\Delta u_{z_i}^S(\zeta,t))=\gamma P(z_i)L_{CR}(z_i)$. $CR(A(t),B(t))\equiv\langle A(t)B^*(t)\rangle$, which represents correlation calculation between A(t) and B(t); $\langle\cdot\rangle$ represents time average operation; $\Delta E(\zeta,t)$ represents the noise part; $\gamma$ represents a nonlinear coefficient; $L_{CR}(z_i)$ is an effective correlation length, $$L_{CR}(z_i) \equiv \int_0^L \frac{P(z)}{P(z_i)} g(z_i-z)dz; g(z_i-z) \equiv CR\left(\Delta u_{z_i}^S(\zeta,t),\Delta u_z^S(\zeta,t)\right)$$

represents a spatial response function; $P(z_i)$ represents the signal power at the predetermined location $z_i$; P(z) represents a signal power at a location z, and the location z is any location on the fiber link.

In some embodiments, the processing circuit is used to: obtain the second template according to the first received waveform, the second template being used for representing a nonlinear noise by a signal and noise waveform at the predetermined location, and the signal and noise waveform at the predetermined location being obtained by the first received waveform; and obtain the second correlation by performing correlation calculation on the noise part and the second template.

In some embodiments, the second template is represented as: $\Delta u_{z_i}^{SN}(\zeta,t)=-j\hat{D}_{z_i,\zeta}\hat{N}_{eRP}\hat{D}_{0,z_i}E_{tot}(0,t)=\hat{D}_{z_i,\zeta}[-j(|E_{tot}(z_i,t)|^2-2)E_{tot}(z_i,t)]$. $\hat{D}_{z_i,\zeta}$ represents chromatic dispersion (CD) from the predetermined location $z_i$ to location $\zeta$ on the fiber link, and the location $\zeta$ is any location on the fiber link that matches with the first received waveform; $\hat{D}_{0,z_i}$ represents CD from the location 0 to the predetermined location $z_i$ on the fiber link; $E_{tot}(0,t)$ represents a signal and noise waveform at the location 0, and $E_{tot}(z_i,t)$ represents the signal and noise waveform at the predetermined location $z_i$; $\hat{N}_{eRP}$ represents a nonlinear operator based on an enhanced regular perturbation (eRP) model; j is an imaginary unit of a complex number; and SN indicates that the second template is generated according to $E_{tot}(0,t)$.

In some examples, $\zeta=0$ in a case that the first received waveform is a CD compensated waveform, and $\zeta=L$ in a case that the first received waveform is a CD uncompensated waveform. The location 0 is a receiving end of the fiber link, the location L is an outputting end of the fiber link.

In some embodiments, the second correlation is represented as: $CR(\Delta E(\zeta,t),\Delta u_{z_i}^{SN}(\zeta,t))=\gamma(P(z_i)+N(z_i))L_{CR}(z_i)$. $CR(A(t),B(t))\equiv\langle(A(t)B^*(t)\rangle$, which represents correlation calculation between A(t) and B(t); $\langle\cdot\rangle$ represents time average operation; $\Delta E(\zeta,t)$ represents the noise part; $\gamma$ represents a nonlinear coefficient; $L_{CR}(z_i)$ is an effective correlation length, $$L_{CR}(z_i) \equiv \int_0^L \frac{P(z)}{P(z_i)} g(z_i - z) dz; \; g(z_i - z) \equiv CR\left(\Delta u_{z_i}^{SN}(\zeta, t), \Delta u_z^{SN}(\zeta, t)\right)$$

represents a spatial response function; P(z) represents a signal power at a location z, and the location z is any location on the fiber link; $P(z_i)$ represents the signal power at the predetermined location $z_i$, and $N(z_i)$ represents the noise power at the predetermined location $z_i$.

In some embodiments, the processing circuit is further used to traverse each location on the fiber link to obtain an gOSNR curve of the fiber link; the gOSNR curve takes locations on the fiber link as vertical axis, and takes gOSNRs as horizontal axis.

In a third aspect, a coherent receiver is provided. The coherent receiver includes a receiving circuit and the device for monitoring gOSNR that is coupled to the receiving circuit; the receiving circuit is used for coupling a fiber link and receiving an optical signal transmitted by the fiber link.

In a fourth aspect, a network apparatus is provided. The network apparatus includes a coherent receiver and the device for monitoring gOSNR that is coupled to the coherent receiver; the coherent receiver is used for coupling a fiber link and receiving an optical signal transmitted by the fiber link.

In some embodiments, the coherent receiver includes a receiving circuit and a digital signal processor (DSP); the receiving circuit is coupled to the fiber link for receiving the optical signal transmitted by the fiber link; the DSP is used to compensate chromatic dispersion (CD) for a second received waveform obtained according to the optical signal to obtain the first received waveform, and then send the first received waveform to the device.

In some other embodiments, the network apparatus further includes the DSP coupled to the coherent receiver and the device; and the DSP is used to compensate chromatic dispersion (CD) for a second received waveform obtained according to the optical signal to obtain the first received waveform, and then send the first received waveform to the device.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings.

DETAILED DESCRIPTION

Figure 1:
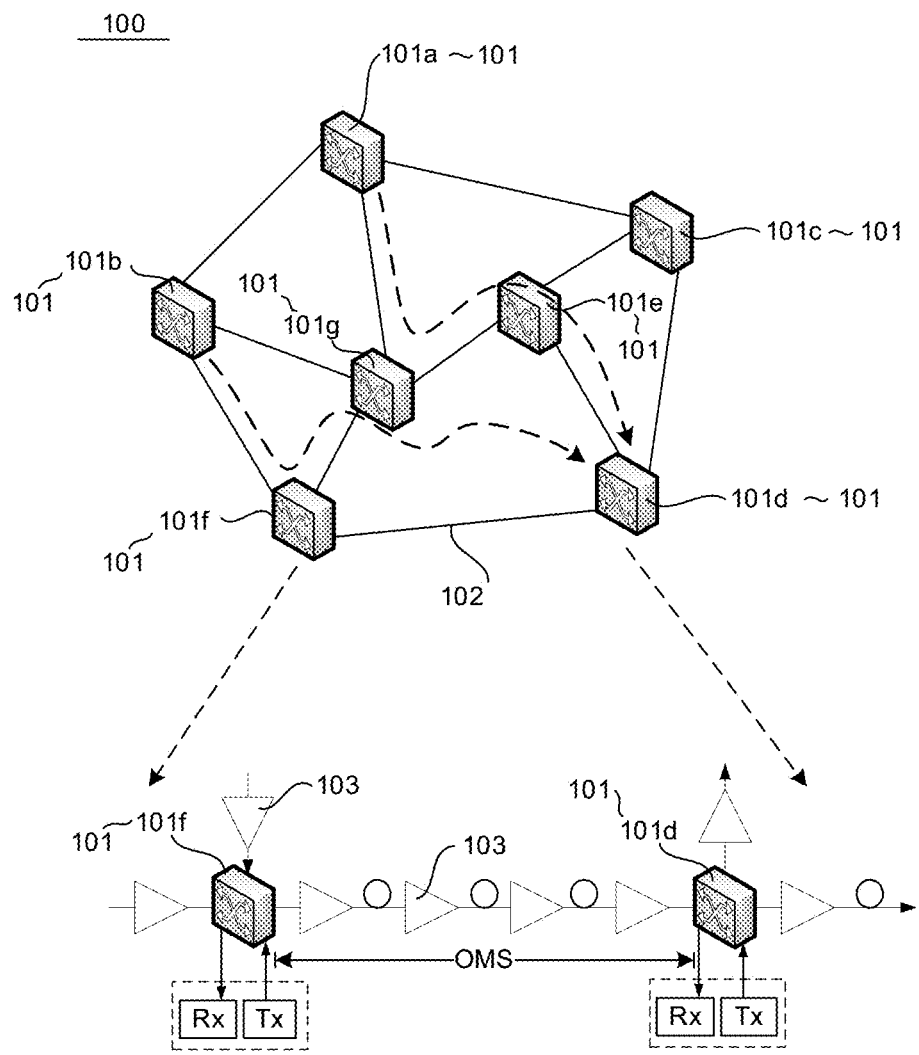
FIG. 1 is an optical communication network, in accordance with some embodiments of the present disclosure.

Technical solutions in embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or examples(s). In addition, the specific features, structures, materials or characteristics may be included in any one or more embodiments or examples in any suitable manner.

The terms used herein are only intended to describe particular representative embodiments and are not intended to be limiting of the present disclosure. As used herein, the singular forms "a," "an" and "the" are intended to include the plural forms as well, unless the context clearly indicates otherwise.

Hereinafter, the terms "first" and "second" are used for descriptive purposes only, and are not to be construed as indicating or implying the relative importance or implicitly indicating the number of indicated technical features. Thus, a feature defined with "first" or "second" may explicitly or implicitly include one or more of the features.

In the description of some embodiments, the terms "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

In addition, the phrase "based on" as used herein is meant to be open and inclusive, since a process, step, calculation or other action that is "based on" one or more of the stated conditions or values may, in practice, be based on additional conditions or value exceeding those stated.

FIG. 1 illustrates an exemplary optical communication network 100. The optical communication network 100 includes a plurality of reconfigurable optical add-drop multiplexer (ROADM) nodes 101 such as 101a to 101g in FIG. 1. The ROADM node 101 is used to multiplex signals with different wavelengths on a fiber link 102. Local devices such as a transmitter (Tx) and a receiver (Rx) can be coupled to the ROADM node 101 to access to the optical network, the Tx and the Rx can be integrated into a transceiver. As shown in FIG. 1, a receiver may communicate with a transmitter through ROADM nodes 101d and 101f in the optical communication network 100. ROADM nodes 101 are coupled through an optical multiplex section (OMS) to ensure complete signal transmission. The OMS between the ROADM nodes 101 is formed by alternately connecting optical amplifiers 103 (e.g., erbium-doped fiber amplifiers, EDFAs) and fibers.

The optical amplifier 103 is used to compensate for various losses such as fiber loss and other component losses. However, the optical amplifier 103, as a device with inherent noise, can generate amplified spontaneous emission (ASE) noise. In addition, In FIG. 1, nonlinear noise such as self-phase modulation (SPM) noise and cross-phase modulation (XPM) noise due to Kerr nonlinear effect are generated during signal propagation, the SPM noise is generated by the signal itself, and the XPM noise is generated by neighboring channels; and transceiver (TRx) noise due to imperfection of the Tx or Rx, and other noises are also generated.

Figure 2:
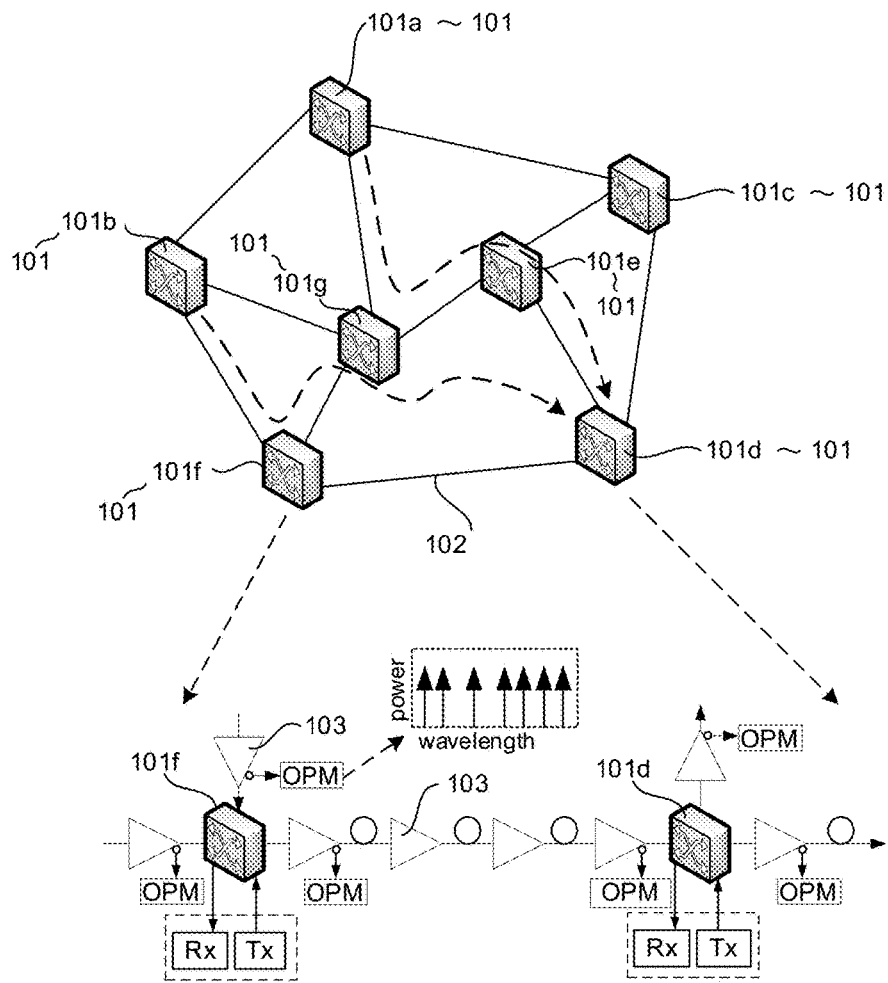
FIG. 2 is an optical communication network in which optical performance monitors (OPMs) are deployed.

In optical communication systems, gOSNR has been accepted and used for a long time as a performance indicator to characterize noises. In the related art, as shown in FIG. 2, many optical performance monitors (OPMs) are deployed in the fiber link to monitor gOSNR. The OPM is typically deployed at the output of the optical amplifier 103. In this solution, due to limitations in locations of OPM deployment, the location flexibility of gOSNR monitoring is not high, and it is impossible to monitor the gOSNR for every single location of the entire fiber link; and a large number of OPMs are required, which will increase the cost.

Based on this, embodiments of the present disclosure provide a method for monitoring gOSNR, which is applied to a device for monitoring gOSNR. The device for monitoring gOSNR is coupled to a fiber link through a coherent receiver (for ease of description, hereinafter referred to as receiver). In some examples, the device for monitoring gOSNR may be integrated into the receiver; or the device for monitoring gOSNR may be arranged separately from the receiver.

Figure 3A:
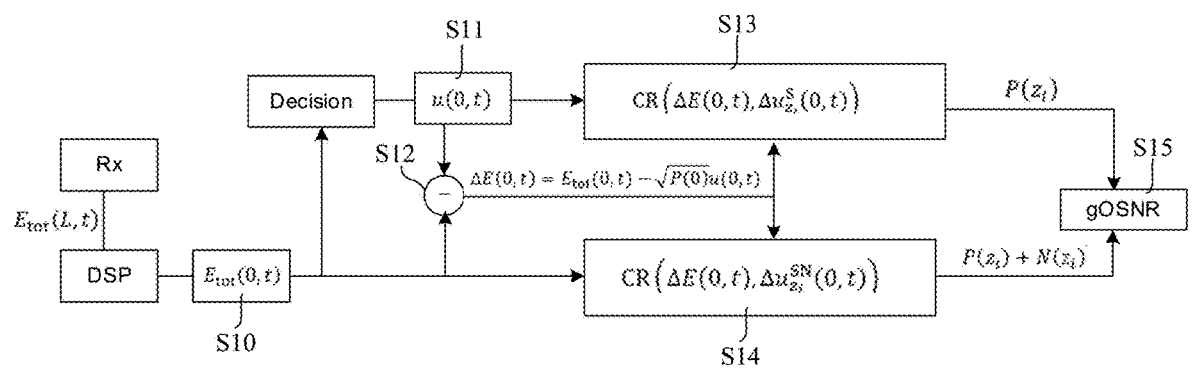
FIG. 3A is a schematic diagram of a method for monitoring gOSNR, in accordance with some embodiments of the present disclosure.

The method is applied to monitoring of the optical signal received by the receiver through the fiber link. As shown in FIG. 3A, the method includes steps S10 to S14.

In S10, a first received waveform is obtained. The first received waveform includes a signal part and a noise part. It will be noted that, the first received waveform may be directly obtained through the optical signal, or the first received waveform may be obtained by processing the optical signal with a digital signal processor (DSP); the first received waveform may be a waveform at any location on the fiber link. The position of the DSP is not limited, and the DSP may be located in the coherent receiver or independent of the coherent receiver.

Figure 4:
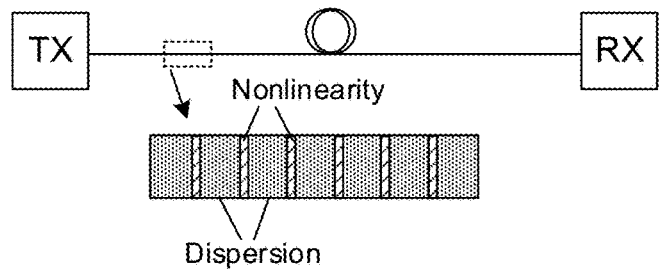
FIG. 4 is a schematic diagram of a section of a fiber in a fiber link.

The unique signal waveform is generated by chromatic dispersion (CD) and nonlinear noise caused by Kerr effect are generated when an optical signal is transmitted in a fiber link. As shown in FIG. 4, a short section of fiber in a fiber link can be considered as repeated chromatic dispersion and nonlinear operations, which can be represented as:

$$\frac{\partial w}{\partial z} = (\hat{D} + \hat{N})W \neq (\hat{N} + \hat{D})W.$$

W is an arbitrary waveform, $\hat{D}$ is a dispersion operator (which is a linear operator), and $\hat{N}$ is a nonlinear operator. It can be seen from this that the operator $\hat{D}$ and the operator $\hat{N}$ are non-permutable. Therefore, the chromatic dispersion process in the fiber link and the nonlinear process caused by the Kerr effect are non-permutable.

The chromatic dispersion gives a unique signal waveform to the transmitted signal at each location along the fiber link, and the unique signal waveform generates a unique nonlinear noise at that location.

That is, a given amount of chromatic dispersion is associated with a given location along the fiber link, and the amount of chromatic dispersion may be representative of a location of the optical signal along the fiber link. For example, given a total amount of chromatic dispersion $CD_{tot}$ detected on the optical signal at the receiver, and given that the fiber link may be partitioned in M segments, an amount of chromatic dispersion linearly accumulated by the optical signal between the transmitter (receiving end of the fiber link) and a segment i is $CD_i=i \times \Delta CD$, where $\Delta CD=CD_{tot}/M$, and i and M are both positive integers.

Figure 5:
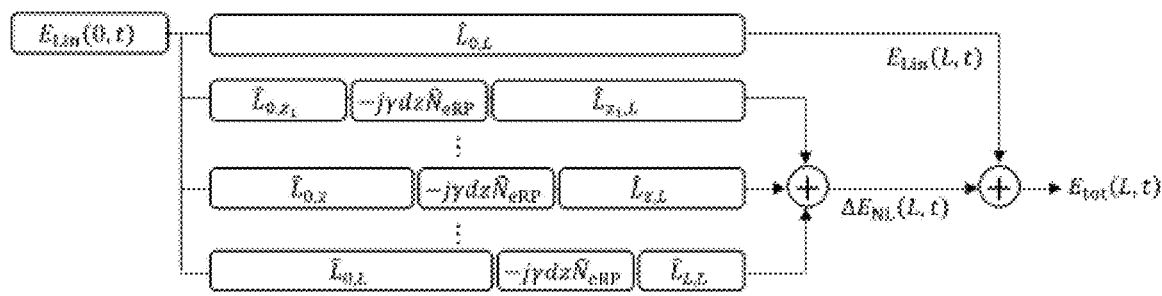
FIG. 5 is an enhanced regular perturbation model, in accordance with some embodiments of the present disclosure.

FIG. 5 illustrates an enhanced regular perturbation (eRP) model provided in embodiments of the present disclosure. The top path is the linear propagation path of the input linear waveform from the transmitter (i.e., the receiving end of the fiber link) to the receiver (i.e., the outputting end of the fiber link). The input linear waveform is represented as: $E_{Lin}(0,t)=\sqrt{P(0)}u(0,t)+\sqrt{N(0)}n(0,t)$, where $P(0)$ and $N(0)$ are the signal power and noise power of the input linear waveform at the transmitter ($z=0$) respectively, $u(0,t)$ and $n(0,t)$ are the normalized waveforms of the signal and noise of the input linear waveform at the transmitter respectively, and t is time. $\hat{L}_{z_i,z_j}=\hat{a}_{z_i,z_j}\hat{D}_{z_i,z_j}$ is a linear propagation operator that combines the propagation loss and the linear chromatic dispersion operator, where $z_i$ and $z_j$ represent the distance from the transmitter, $\hat{a}_{z_i,z_j}=\sqrt{P(z_j)/P(z_i)}$ is the propagation gain/loss operator, and the chromatic dispersion operator $\hat{D}_{z_i,z_j}$ represents adding chromatic dispersion in the waveform from location $z_i$ to $z_j$. $P(z_j)$ and $P(z_i)$ represents the signal powers at location $z_j$ and $z_i$ respectively; $\hat{D}_{z_i,z_j}\equiv\hat{F}^{-1}\tilde{D}_{z_i,z_j}(\omega)\hat{F}$, where $\hat{F}$ is the Fourier transform operator, $$\tilde{D}_{z_iz_j}(\omega) \equiv \exp\left(-j\left(\frac{\omega^2}{2}\int_{z_i}^{z_j}\beta_2(z)dz + \frac{\omega^3}{6}\int_{z_i}^{z_j}\beta_3(z)dz\right)\right),$$

and $\omega$ is the angular frequency. Therefore, the linear waveform at the receiver ($z=L$) is $E_{Lin}(L,t)=\hat{L}_{0,L}E_{Lin}(0,t)=\sqrt{P(L)}u(L,t)+\sqrt{N(L)}n(L,t)$. $P(L)$ and $N(L)$ are the signal power and noise power at the receiver respectively, $u(L,t)$ and $n(L,t)$ are the normalized waveforms of the signal and noise at the receiver respectively.

Other paths are nonlinear paths that generate nonlinear noise at various locations (local locations). For example, the nonlinear noise of the location $z_1$ may be generated by the linear propagation from the receiving end (location 0) to the location $z_1$ on the fiber link, the nonlinear operation, and then the linear propagation from the location $z_1$ to the outputting end of the fiber link. The nonlinear noise of the location $z_1$ may be represented as $-j\gamma dz\hat{L}_{z_1,L}\hat{N}_{eRP}\hat{L}_{0,z_1}E_{Lin}(0,t)$. Herein, $-j\gamma dz\hat{N}_{eRP}$ is the nonlinear operation, where j is the imaginary unit of the complex number, $\gamma$ is the nonlinear coefficient, and $\hat{N}_{eRP}$ is the nonlinear operator based on the eRP model.

According to the eRP model, the total waveform at the receiver (outputting end of the fiber link) may be represented as:

$E_{tot}(L,t)=E_{Lin}(L,t)+\Delta E_{NL}(L,t)=\sqrt{P(L)}u(L,t)+\sqrt{N(L)}n(L,t)+\int_0^L -j\gamma\hat{L}_{z,L}\hat{N}_{eRP}\hat{L}_{0,z}E_{Lin}(0,t)dz$, where $\Delta E_{NL}(L,t)$ represents the total nonlinear noise.

Based on this, in some embodiments, a second received waveform obtained by the optical signal may be directly used as the first received waveform, in which case CD compensation is not performed on the fiber link; or the DSP may be used to perform CD compensation on the second received waveform obtained by the optical signal, so as to obtain the first received waveform. For a CD uncompensated waveform, the first received waveform is $E_{tot}(L,t)$, which includes the signal part and the noise part; the noise part includes linear noise and nonlinear noise, which is represented as $\Delta E(L,t)\equiv E_{tot}(L,t)-\sqrt{P(L)}u(L,t)$. For a CD compensated waveform, the first received waveform may be represented as $E_{tot}(0,t)$, and the noise part of the first received waveform may be represented as $\Delta E(0,t)=E_{tot}(0,t)-\sqrt{P(0)}u(0,t)$. It will be noted that FIG. 3A illustrates an example where the first received waveform is the CD compensated waveform.

Of course, the first received waveform may be a waveform at any location on the fiber link, and may be represented as $E_{tot}(\zeta,t)$; and the noise part of the first received waveform may be represented as $\Delta E(\zeta,t)=E_{tot}(\zeta,t)-\sqrt{P(\zeta)}u(\zeta,t)$. $\zeta$ indicates a location on the fiber link. $\zeta$ indicates a location of CD accumulation.

In S11, the signal part of the first received waveform is obtained.

In some embodiments, the signal part of the first received waveform may be obtained by hard decision. For the CD uncompensated waveform, the CD compensation may be performed in S11 to take decision, and then the compensated CD may be added to generate the signal part $u(L,t)$. For the CD compensated waveform, the waveform of the signal part is $u(0,t)$.

In S12, the noise part of the first received waveform is obtained according to the signal part of the first received waveform and the first received waveform.

The noise part of the first received waveform may be obtained by subtracting the signal part of the first received waveform from the first received waveform. For the CD uncompensated waveform, the noise part is $\Delta E(L,t)$; for the CD compensated waveform, the noise part is $\Delta E(0,t)$. The noise part may also be $\Delta E(\zeta,t)$.

In S13, a first correlation between the noise part and the first template at a predetermined location on the fiber link is obtained. The first correlation indicates the signal power at the predetermined location.

It will be noted that the predetermined location may be any selected location on the fiber link.

Figure 3B:
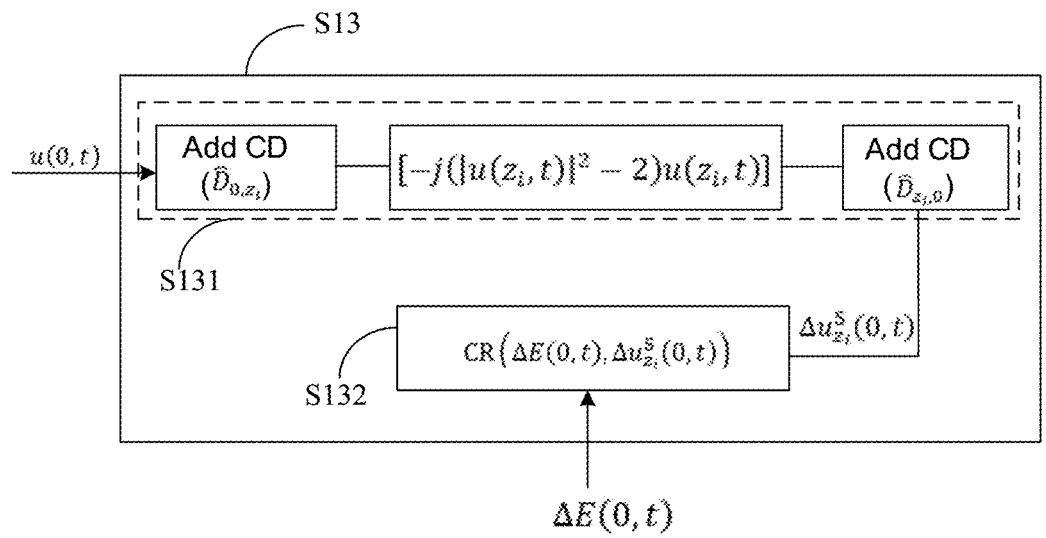
FIG. 3B is a schematic diagram of a process of S13 in FIG. 3A, in accordance with some embodiments of the present disclosure.

In some embodiments, as shown in FIG. 3B, the step of obtaining the first correlation between the noise part and the first template at the predetermined location on the fiber link in S13 includes steps S131-S132.

In S131, the first template is obtained according to the signal part of the first received waveform. The first template is used for representing a nonlinear noise by a signal part at the predetermined location, and the signal part at the predetermined location is obtained by the signal part of the first received waveform.

For example, the first template is obtained by the signal waveform at the receiving end of the fiber link, i.e., the normalized signal waveform at the transmitter, $u(0,t)$, and $u(0,t)$ can be obtained by the signal part of the first received waveform. On this basis, the signal part at the predetermined location may be obtained by $u(0,t)$.

It will be noted that, the signal part of the first received waveform in S131 may be represented by the signal waveform. Of course, in other embodiments of the present disclosure, the signal part of the first received waveform may also be represented by signal power.

Since the first template can be prepared according to the location, any impairment that affects the waveform at that location may be retrieved based on the optical signal received by the receiver; therefore, the nonlinear noise at that location may be obtained.

In S132, the first correlation is obtained by performing correlation calculation on the noise part and the first template.

Since the first template is associated with the nonlinear noise corresponding to the location, and the noise part includes the total nonlinear noise, the correlation between the location corresponding to the nonlinear noise and the location corresponding to the total nonlinear noise may be obtained through the first correlation. As a result, the signal power corresponding to the location may be obtained.

In some embodiments, the first template may be prepared according to the eRP model, so as to obtain the signal power corresponding to the location. For a single-polarization optical signal, the first template may be represented as: $\Delta u_{z_i}^s(\zeta,t) = -j\hat{D}_{z_i,\zeta}\hat{N}_{eRP}\hat{D}_{0,z_i}u(0,t) = \hat{D}_{z_i,\zeta}[-j(|u(z_i,t)|^2-2)u(z_i,t)]$. For a dual-polarization optical signal, the first template includes a first sub-template of x-polarization and a second sub-template of y-polarization. The first sub-template may be represented as: $\Delta u_{x,z_i}^S(\zeta,t) = \hat{D}_{z_i,\zeta}[-j(|u_x(z_i,t)|^2+|u_y(z_i,t)|^2-3)u_x(z_i,t)]$, and the second sub-template may be represented as: $\Delta u_{y,z_i}^S(\zeta,t) = \hat{D}_{z_i,\zeta}[-j(|u_x(z_i,t)|^2+|u_y(z_i,t)|^2-3)u_y(z_i,t)]$.

Here, $\hat{D}_{z_i,\zeta}$ represents the CD from the predetermined location $z_i$ to a location $\zeta$ on the fiber link, and the location $\zeta$ is any location on the fiber link that matches with the first received waveform. For example, in the case where the first received waveform is the CD compensated waveform, $\zeta=0$; in the case where the first received waveform is the CD uncompensated waveform, $\zeta=L$, where L indicates the location of the outputting end of the fiber link. $\hat{D}_{0,z_i}$ represents the CD from the location 0 to the predetermined location $z_i$; u(0,t) represents the normalized linear signal waveform at the location 0, and $u(z_i,t)$ represents the signal part at the predetermined location $z_i$, which can be obtained according to the first received waveform; $\hat{N}_{eRP}$ represents the nonlinear operator based on the eRP model; j is the imaginary unit of the complex number; S indicates that the first template is generated according to u(0,t), and $\Delta u_{z_i}^S(\zeta,t)$ indicates that the template is prepared for the predetermined location $z_i$.

For example, u(0,t) may be generated by the DSP by hard decision.

It will be noted that, the subsequent description is centered on the first template corresponding to the single-polarization. For the dual-polarization, the sub-templates corresponding to each polarization are independent; therefore, each sub-template performs a correlation operation independently. For details, reference may be made to description of the first template corresponding to the single-polarization.

In the case where the first received waveform is the CD compensated waveform, the first template may be represented as: $\Delta u_{z_i}^S(0,t) = -j\hat{D}_{z_i,0}\hat{N}_{eRP}\hat{D}_{0,z_i}u(0,t) = \hat{D}_{z_i,0}[-j(|u(z_i,t)|^2-2)u(z_i,t)]$.

The first template may indicate the relationship between the nonlinear noise at different locations on the fiber link and the signal part of the first received waveform (i.e., the linear signal waveform). Therefore, when the signal part of the first received waveform is obtained, the nonlinear noise at any location where the linear signal waveform is transmitted to may be obtained according to the linear signal waveform.

In some embodiments, the first correlation is represented as: $CR(\Delta E(\zeta,t), \Delta u_{z_i}^S(\zeta,t)) = \int_0^L \gamma P(z)g(z_k-z)dz \equiv \gamma P(z_i)L_{CR}(z_i)$.

Here, $CR(A(t),B(t)) \equiv \langle A(t)B^*(t) \rangle$, which indicates performing correlation calculation on A(t) and B(t); $\langle \cdot \rangle$ represents time average operation. $\Delta E(\zeta,t)$ represents the noise part; $\gamma$ represents the nonlinear coefficient. $L_{CR}(z_i)$ represents the effective correlation length, $$L_{CR}(z_i) \equiv \int_0^L \frac{P(z)}{P(z_i)} g(z_i - z) dz; \quad g(z_i - z) \equiv CR\left(\Delta u_{z_i}^S(\zeta, t), \Delta u_z^S(\zeta, t)\right)$$

represents the spatial response function. $P(z_i)$ represents the signal power at the predetermined location $z_i$. $P(z)$ represents a signal power at a location z, and the location z is any location on the fiber link.

The spatial response function $g(z_i-z)$ represents the correlation of nonlinear noise at locations $z_i$ and z, and the spatial response function is determined by the CD coefficient and signal baud rate of the fiber link.

In this correlation, the resulted power is convoluted with the spatial response function $g(z_i-z)$. In order to obtain true power profile, it requires scaling by $\gamma$ and $L_{CR}$.

It will be noted that, since the linear signal is not correlated with the first template, the first correlation may also be directly represented by the first received waveform. In the case where the first received waveform is the CD uncompensated waveform, the first correlation is represented as $CR(E_{tot}(L,t), \Delta u_{z_i}^S(L,t))$; and in the case where the first received waveform is the CD compensated waveform, the first correlation is represented as $CR(E_{tot}(0,t), \Delta u_{z_i}^S(0,t))$, which does not affect the obtained correlation result.

By repeating the first correlation operation for all locations, a signal power profile may be obtained, which is called power profile estimation (PPE).

In S14, a second correlation between the noise part and a second template at the predetermined location is obtained. The second correlation indicates a signal power and noise power at the predetermined location.

Figure 3C:
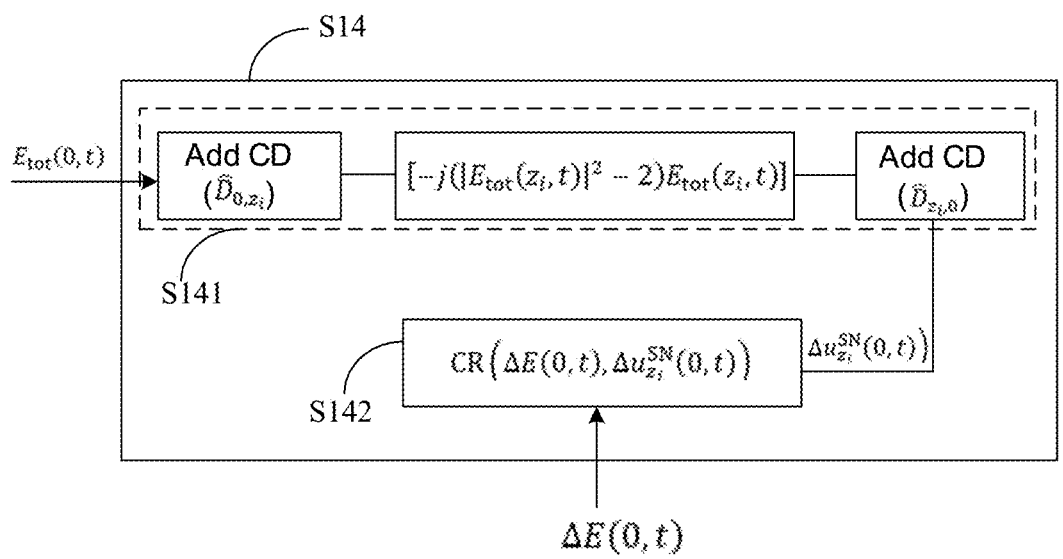
FIG. 3C is a schematic diagram of a process of S14 in FIG. 3A, in accordance with some embodiments of the present disclosure.

In some embodiments, as shown in FIG. 3C, the step of obtaining the second correlation between the noise part and the second template at the predetermined location on the fiber link in S14 includes steps S141 and S142.

In S141, the second template is obtained according to the first received waveform. The second template is used for representing a nonlinear noise by a signal and noise waveform at the predetermined location, and the signal and noise waveform at the predetermined location is obtained by the first received waveform.

Since pure noise at the outputting end of the fiber link cannot be obtained, the second template may be prepared by using the total waveform. Therefore, the second template includes the signal and noise waveform.

In S142, the second correlation is obtained by performing correlation calculation on the noise part and the second template.

Since the second template is associated with the signal and noise waveform corresponding to the location, and the noise part is associated with the first received waveform, the correlation between the location corresponding to the signal and noise waveform and the location corresponding to the noise part may be obtained through the second correlation. As a result, the signal power and noise power corresponding to the location may be obtained.

In some embodiments, the second template may be prepared according to the eRP model, so as to obtain the signal power and noise power corresponding to the location. The second template is represented as: $\Delta u_{z_i}^{SN}(\zeta,t) = -j\hat{D}_{z_i,\zeta}\hat{N}_{eRP}\hat{D}_{0,z_i}E_{tot}(0,t) = \hat{D}_{z_i,\zeta}[-j(|E_{tot}(z_i,t)|^2-2)E_{tot}(z_i,t)]$.

Here, $\hat{D}_{z_i,\zeta}$ represents the CD from the predetermined location $z_i$ to the location $\zeta$ on the fiber link, and the location $\zeta$ is any location on the fiber link that matches with the first received waveform. For example, in the case where the first received waveform is the CD compensated waveform, $\zeta=0$;

and in the case where the first received waveform is the CD uncompensated waveform, $\zeta=L$, and L is the location of the outputting end of the fiber link. $\hat{D}_{0,z_i}$ represents the CD from the location 0 to the predetermined location $z_i$ on the fiber link. $E_{tot}(0,t)$ represents a signal and noise waveform at the location 0, and $E_{tot}(z_i,t)$ represents the signal and noise waveform at the predetermined location $z_i$. $\hat{N}_{eRP}$ represents the nonlinear operator based on the eRP model; j is the imaginary unit of the complex number; SN indicates that the second template is generated according to $E_{tot}(0,t)$, and $\Delta u_{z_i}^{SN}(\zeta,t)$ indicates that the template is prepared for the predetermined location $z_i$.

The second template may indicate the relationship between waveforms at different locations on the fiber link and $E_{tot}(0,t)$. Therefore, when $E_{tot}(0,t)$ is obtained, the waveform at any location where $E_{tot}(0,t)$ is transmitted to may be obtained according to the obtained $E_{tot}(0,t)$.

In some embodiments, the second correlation is represented as: $CR(\Delta E(\zeta,t),\Delta u_{z_i}^{SN}(\zeta,t))=\gamma(P(z_i)+N(z_i))L_{CR}(z_i)$.

Here, $CR(A(t),B(t))\equiv \langle A(t)B^*(t)\rangle$, which indicates performing correlation calculation on A(t) and B(t); $\langle \cdot \rangle$ represents time average operation. $\Delta E(\zeta,t)$ represents the noise part; $\gamma$ represents the nonlinear coefficient. $L_{CR}(z_i)$ represents the effective correlation length, $$L_{CR}(z_i) \equiv \int_0^L \frac{P(z)}{P(z_i)} g(z_i-z)dz;\ g(z_i-z) \equiv CR\left(\Delta u_{z_i}^{SN}(\zeta,t),\Delta u_z^{SN}(\zeta,t)\right)$$

represents the spatial response function. P(z) represents a signal power at a location z, and the location z is any location on the fiber link. $P(z_i)$ represents the signal power at the predetermined location $z_i$, and $N(z_i)$ represents the noise power at the predetermined location $z_i$. The noise power may include all existing noises such as ASE noise, SPM noise, XPM noise, TRx noise, and etc. For example, $N(z_i)=N_{ASE}(z_i)+N_{SPM}(z_i)+N_{XPM}(z_i)+N_{TRx}(z_i)$, where $N_{ASE}(z_i)$ represents the ASE noise power at the predetermined location $z_i$, $N_{SPM}(z_i)$ represents the SPM noise power at the predetermined location $z_i$ $N_{XPM}(z_i)$ represents the XPM noise power at the predetermined location $z_i$, $N_{TRx}(z_i)$ represents the TRx noise power at the predetermined location $z_i$. in addition, $N(z_i)$ may also include powers of other noises.

The spatial response function $g(z_i-z)$ represents the correlation between signal and noise waveforms at locations $z_i$ and z. In order to obtain true power profile, it requires scaling by $\gamma$ and $L_{CR}$.

By repeating the second correlation operation for all locations, a power profile (sum of noise and signal power) may be obtained, which is called noise power profile estimation (NPPE).

In S15, the gOSNR at the predetermined location is obtained according to the first correlation and the second correlation.

Based on the above, the gOSNR at the predetermined location may be obtained by taking the ratio of the first correlation to the second correlation, which may be represented as:

$$gOSNR(z_i) = \left(\frac{CR(\Delta E(L,t),\Delta u_{z_i}^{SN}(L,t))}{CR(\Delta E(L,t),\Delta u_{z_i}^{S}(L,t))}-1\right)^{-1} BW = \frac{P(z_i)}{N(z_i)}BW.$$

Herein, $$BW = \frac{f_{baud}}{12.5\ \text{GHz}}$$

is the conversion factor from SNR (signal-to-noise ratio) to gOSNR, and $f_{baud}$ is the signal baud rate. The scaling factor $\gamma$ and $L_{CR}$ in the first correlation and the second correlation are canceled out while taking their ratio, therefore the resulted gOSNR does not require additional scaling.

In the method for monitoring gOSNR provided in the embodiments of the present disclosure, after the first received waveform is obtained, the noise part of the first received waveform is obtained based on the first received waveform. Next, the first correlation between the noise part and the first template at a predetermined location on the fiber link is obtained, the first correlation indicating the signal power at the predetermined location, and the second correlation between the noise part and the second template at the predetermined location is obtained, the second correlation indicating the signal power and noise power at the predetermined location. On this basis, according to the signal power at the predetermined location indicated by the first correlation and the signal power and noise power at the predetermined location indicated by the second correlation, the gOSNR may be calculated. Based on this, when the predetermined locations are different, the gOSNR corresponding to each predetermined location may be obtained, thereby obtaining a longitudinal (location-resolved) gOSNR monitoring only through the received optical signal on the fiber link. In addition, since there's no need to provide additional monitoring devices on the fiber link, the costs may also be reduced.

Figure 6:
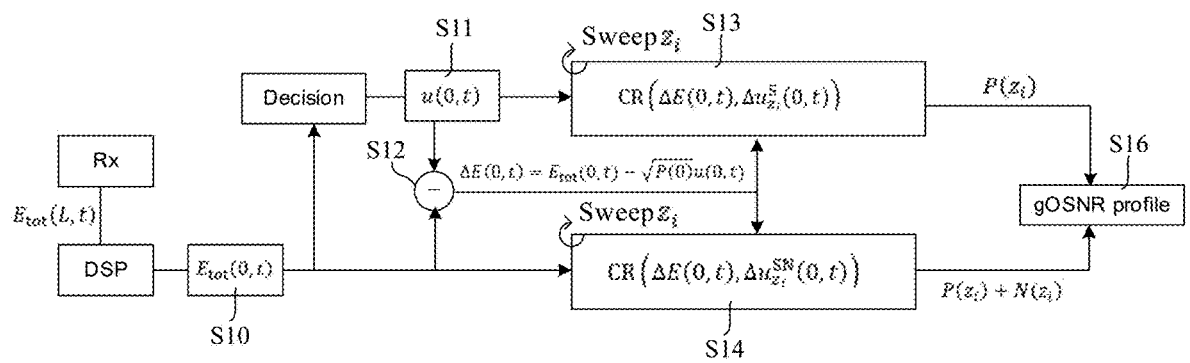
FIG. 6 is a schematic diagram of another method for monitoring gOSNR, in accordance with some embodiments of the present disclosure.

In some embodiments, as shown in FIG. 6, the method further includes step S16.

In S16, each location on the fiber link is traversed, and a gOSNR curve on the fiber link is obtained. The gOSNR curve takes locations on the fiber link as vertical axis, and takes gOSNRs as horizontal axis.

The process of traversing each location on the fiber link may, for example, be like this: the first correlation is obtained M times and the second correlation is obtained M times; the location of the first correlation obtained each time is different, and the location of the second correlation obtained each time is different. In this way, the gOSNR curve of the fiber link may be obtained. By obtaining the gOSNR curve of the fiber link, the gOSNR at any location may be obtained intuitively.

The method proposed in the embodiments of the present disclosure is verified below through simulations.

Figure 7:
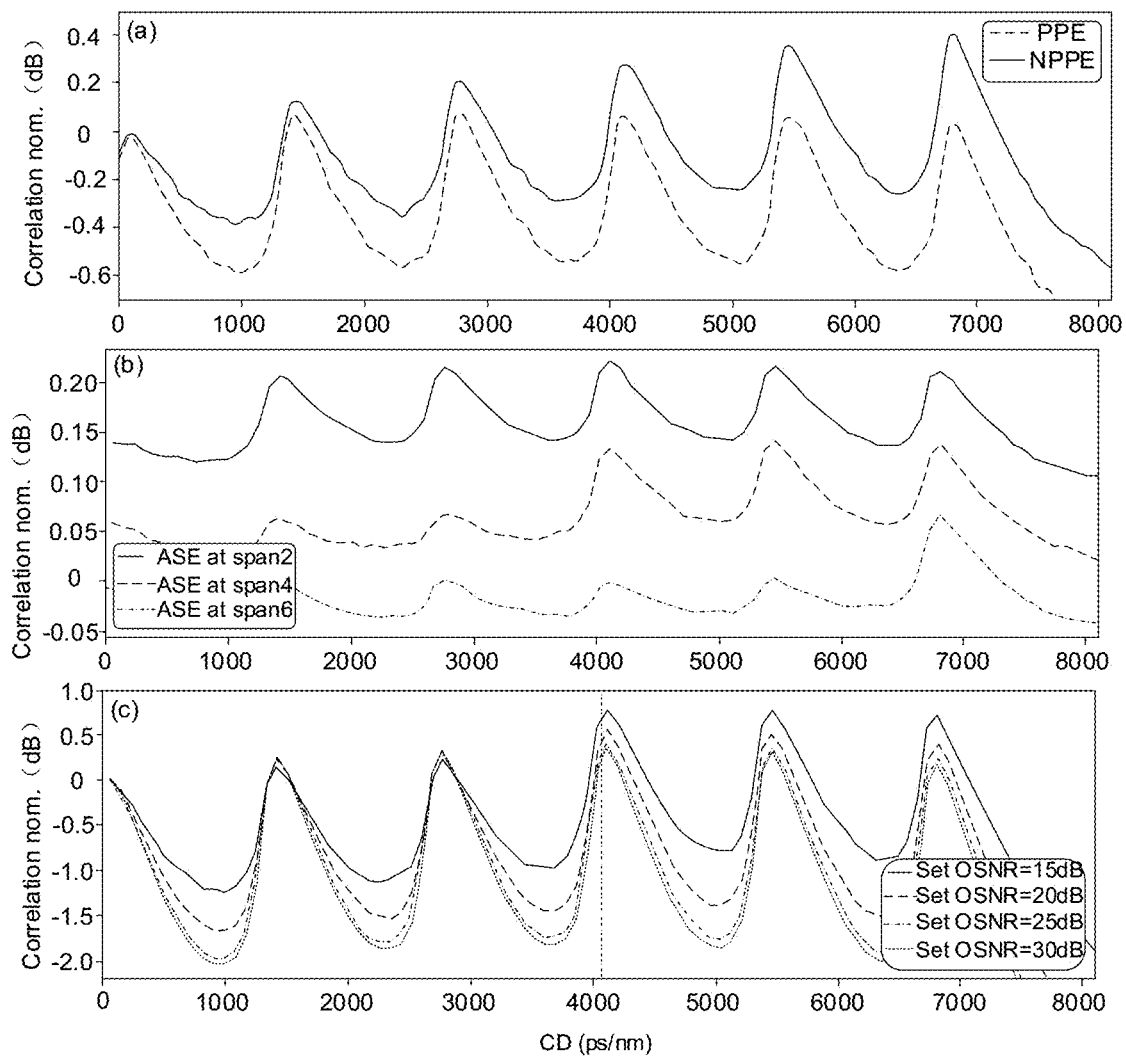
FIG. 7 is simulation results of detecting amplified spontaneous emission (ASE) noise power.

FIG. 7 shows simulation results of detecting ASE noise power. The simulated fiber link consists of 6×80 km standard single mode fiber (SSMF) spans with 68 Gbaud quadrature phase shift keying (QPSK) signals. Only ASE noise is considered in the simulation to keep the problem simple and clear. In FIG. 7, the horizontal axis represents CD amount, and the vertical axis represents the correlation.

First, constant ASE noise (OSNR is set to be 20 dB) is injected in an input of every span. NPPE (the second correlation) and PPE (the first correlation) are performed, and the estimated profiles are shown in part (a) in FIG. 7 as a solid curve and a dashed curve, respectively. Both profiles are normalized by a first correlation peak value. As shown, the peaks at spans of the NPPE are increasing with respect to the accumulated ASE noise power, while the PPE shows constant peak correlations. This confirms that the NPPE detects a total local power (signal and noise power) while PPE only detects a local signal power, thus the difference between NPPE and PPE is a local noise power.

Next, the ASE noise is injected at a single location. Part (b) in FIG. 7 shows NPPE curves for ASE noise injected at different spans. In the figure, the vertical separation is artificially added for easier comparison. In part (b) in FIG. 7, the ASE noise is injected at a second span, fourth span and sixth span, and it is clearly observed in NPPE profiles as the strong peak correlations. Part (c) in FIG. 7 shows the NPPE with different noise power, where the vertical dashed line indicates the location of ASE noise injection. The correlation peak increasement with respect to the injected noise power is observed after the injection location, which again confirms the noise power detection by the NPPE.

From the simulations shown in FIG. 7, the detection of ASE noise power by the proposed method is clearly confirmed.

Figure 8:
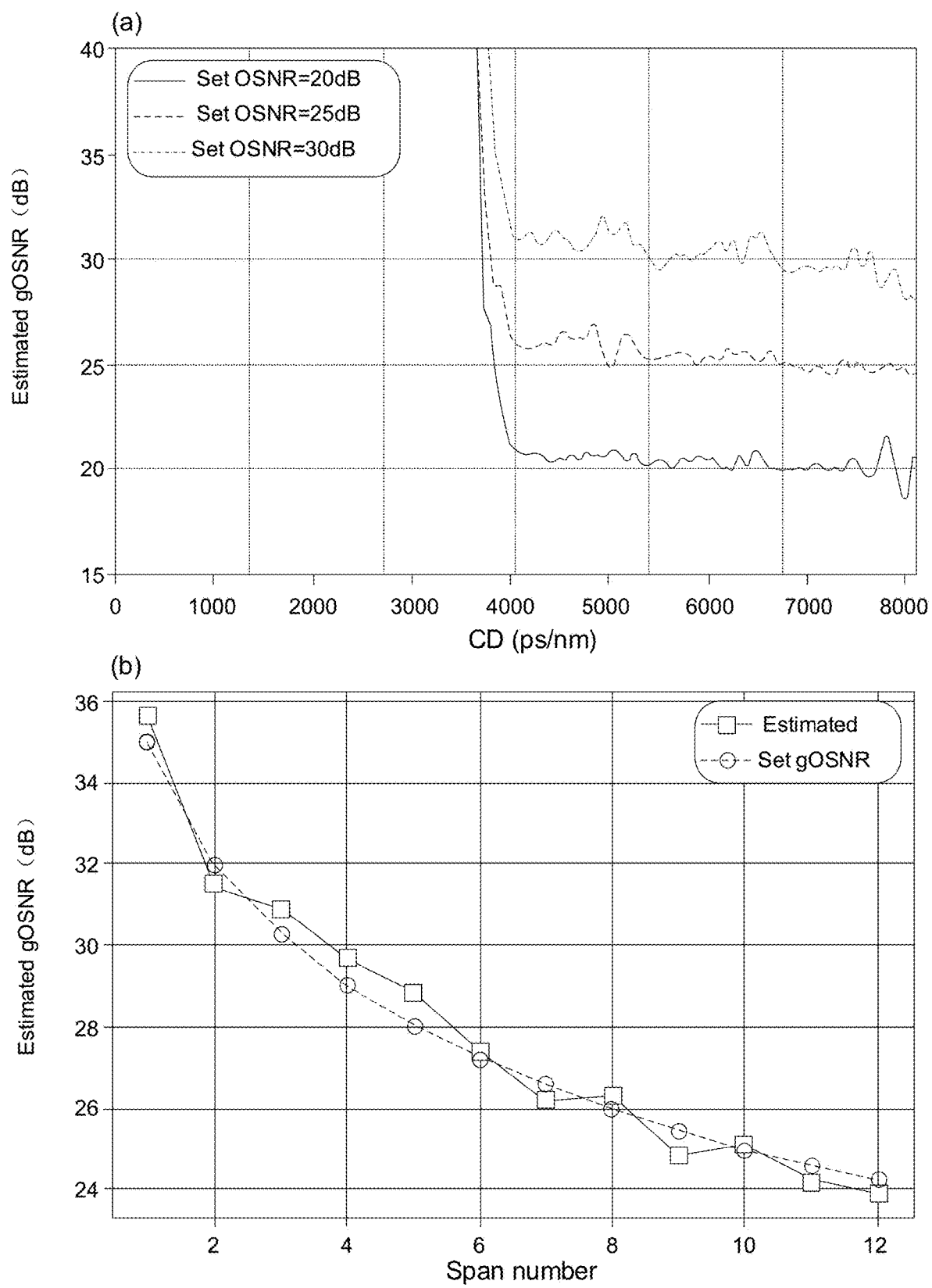
FIG. 8 is simulation results of detecting gOSNR.

FIG. 8 shows simulation results of detecting gOSNR.

The gOSNR estimation requires two correlations with different templates, namely the first correlation and the second correlation. In addition to the NPPE (the second correlation) shown in part (c) in FIG. 7, the PPE (the first correlation) is performed to obtain the signal power profile. From these correlations and the gOSNR conversion equation, the gOSNR is directly estimated and presented in part (a) in FIG. 8. Before the fourth span, the gOSNR is infinite since there is no ASE noise. After the fourth span, the gOSNR is constant due to the single-point ASE noise injection. The estimated gOSNRs are well matched with set OSNR in the simulation. It should be noted that, the estimated gOSNR is equivalent to OSNR because the simulation condition is constrained to have only ASE noise.

In addition to the single-point noise injection, another simulation is performed for a 12-span link by mimicking the ASE noise injection by EDFA. The dashed curve in part (b) in FIG. 8 is the real gOSNR at each span, and the solid curve in part (b) in FIG. 8 is the gOSNR estimated by the proposed method. Due to the good agreement between the set gOSNR and estimated gOSNR, the proposed method is confirmed in simulation.

In order to verify the longitudinal gOSNR estimation, two experiments are performed. Experimental conditions:
75 km SSMF fiber span (number of span changes 6 or 12);
QPSK 68 Gbaud transmission signal;
Using commercial transceiver (TRx) (including ADC buffer).
Experiment 1: testing with and without artificial ASE noise injection.

Figure 9:
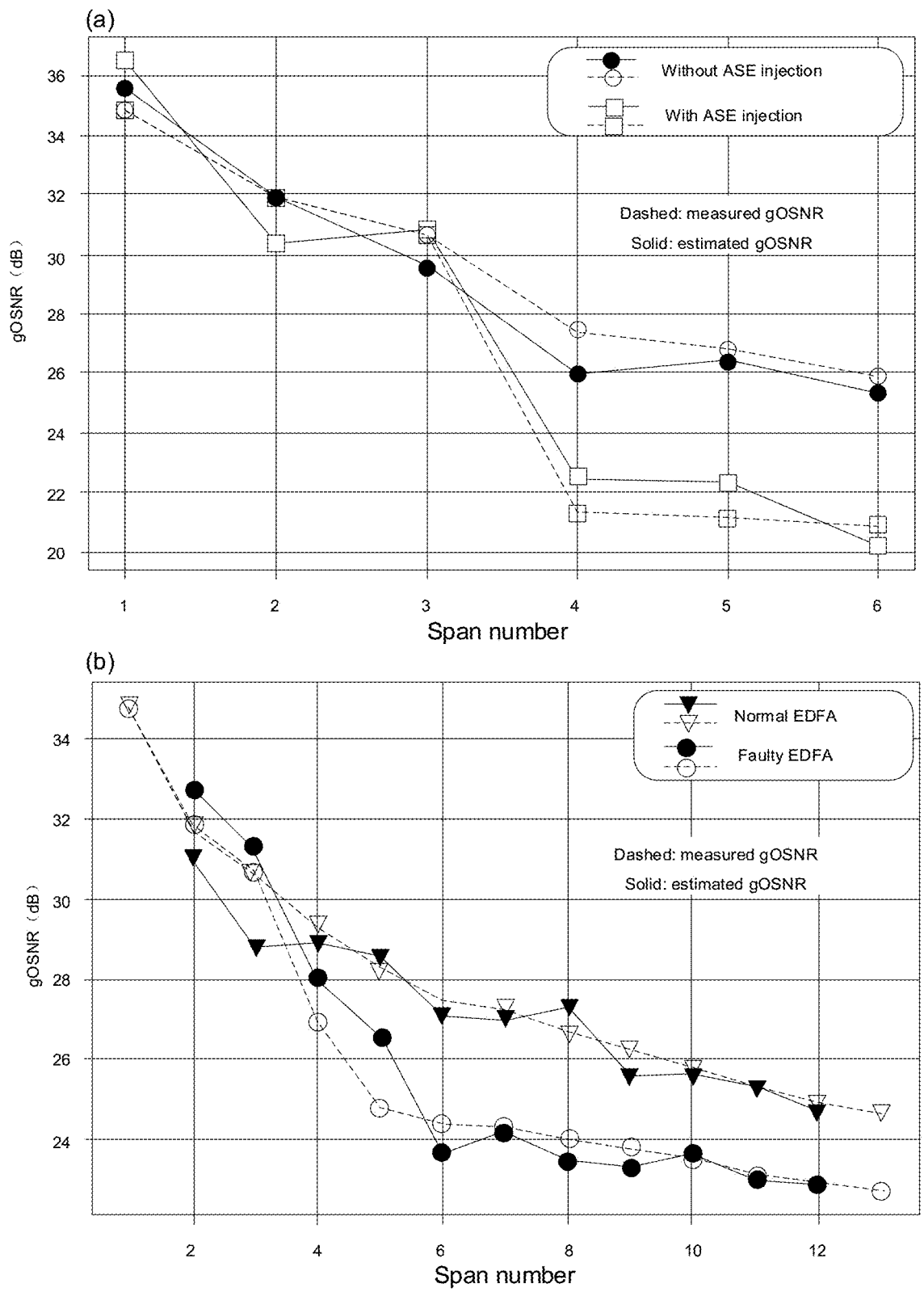
FIG. 9 is experimental results of detecting gOSNR.

Part (a) in FIG. 9 shows the typical gOSNR drop without artificial ASE noise injection in the 6-span configuration, and the additional gOSNR drop at the fourth span of the 6-span configuration due to the artificial ASE noise injection, where the dashed curve is the measured gOSNR at each span, and the solid curve is the gOSNR profile estimated by the proposed method. As can be seen from Part (a) in FIG. 9, the estimated gOSNR profile well agrees with the measured gOSNR, which confirms the gOSNR (noise power) monitoring functionality of the proposed method.

Experiment 2, testing a normal link and a link with amplifier defect.

The 12-span system with same link conditions is tested in the experiment. Firstly, the normal link without any defect is tested; and then the gain is set to be lower for two spans (the fourth span and the fifth span) in the middle of the link, which is mimicking the faulty amplifiers (which can lead to lower span launch power and consequent gOSNR drops) that can happen in the practical link. As shown in part (b) in FIG. 9, by comparing the measured gOSNR profile (a dashed curve) of the normal EDFAs and the measured gOSNR profile (another dashed curve) of two faulty EDFAs in the middle of link, the gOSNR drop is clearly observed. The gOSNR profiles for two cases are also estimated by the proposed method for the entire link, which are plotted in solid curves in part (b) in FIG. 9. As shown, the estimated gOSNR profile well agrees with the measured gOSNR, which confirms the gOSNR (noise power) monitoring functionality of the proposed method.

Figure 10:
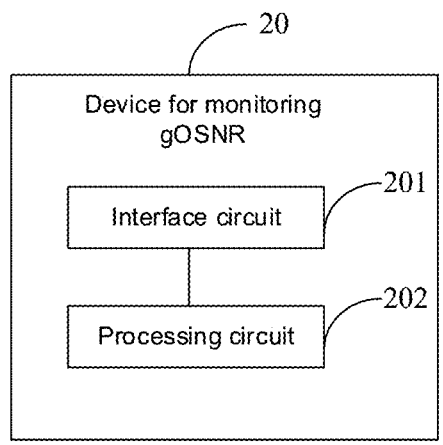
FIG. 10 is a schematic structural diagram of a device for monitoring gOSNR, in accordance with some embodiments of the present disclosure.

Embodiments of the present disclosure provide a device for monitoring gOSNR, which is applied to monitoring of an optical signal received by a coherent receiver through a fiber link. As shown in FIG. 10, the device 20 includes an interface circuit 201 and a processing circuit 202.

The interface circuit 201 is used to obtain a first received waveform, and the first received waveform includes a signal part and a noise part.

The processing circuit 202 is coupled to the interface circuit 201. The processing circuit 202 is used to: obtain the signal part of the first received waveform; obtain the noise part of the first received waveform according to the signal part of the first received waveform and the first received waveform; obtain a first correlation between the noise part and a first template at a predetermined location on the fiber link, the first correlation indicating a signal power at the predetermined location; obtain a second correlation between the noise part and a second template at the predetermined location on the fiber link, the second correlation indicating a signal power and noise power at the predetermined location; and obtain gOSNR at the predetermined location according to the first correlation and the second correlation.

In the device 20 for monitoring gOSNR provided in the embodiments of the present disclosure, after obtaining the first received waveform, the processing circuit 202 obtains the noise part based on the first received waveform, and then obtains the first correlation between the noise part and the first template at the predetermined location on the fiber link, the first correlation indicating the signal power at the predetermined location, and obtains the second correlation between the noise part and the second template at the predetermined location on the fiber link, the second correlation indicating the signal power and noise power at the predetermined location; on this basis, gOSNR can be calculated according to the signal power at the predetermined location indicated by the first correlation and the signal power and noise power at the predetermined location indicated by the second correlation. Based on this, when the predetermined locations are different, the gOSNR corresponding to each predetermined location may be obtained, thereby obtaining a longitudinal (location-resolved) gOSNR monitoring only through the received optical signal on the fiber link. In addition, since there's no need to provide additional monitoring devices on the fiber link, the costs may also be reduced.

In some embodiments, the processing circuit 202 is used to: obtain the first template according to the signal part of the first received waveform, the first template being used for representing a nonlinear noise by a signal part at the predetermined location, and the signal part at the predetermined location being obtained by the signal part of the first received waveform; and obtain the first correlation by performing correlation calculation on the noise part and the first template.

In some embodiments, for a single-polarization optical signal, the first template is represented as: $\Delta u_{z_i}^S(\zeta, t) = -j\hat{D}_{z_i,\zeta}\hat{N}_{eRP}\hat{D}_{0,z_i}u(0,t) = \hat{D}_{z_i,\zeta}[-j(|u(z_i,t)|^2-2)u(z_i,t)]$. For a dual-polarization optical signal, the first template includes a first sub-template of x-polarization and a second sub-template of y-polarization; the first sub-template is represented as: $\Delta u_{x,z_i}^S(\zeta,t) = \hat{D}_{z_i,\zeta}[-j(|u_x(z_i,t)|^2+|u_y(z_i,t)|^2-3)u_x(z_i,t)]$; the second sub-template is represented as: $\Delta u_{y,z_i}^S(\zeta,t) = \hat{D}_{z_i,\zeta}[-j(|u_x(z_i,t)|^2+|u_y(z_i,t)|^2-3)u_y(z_i,t)]$.

$\hat{D}_{z_i,\zeta}$ represents CD from the predetermined location $z_i$ to a location $\zeta$ on the fiber link, and the location $\zeta$ is any location on the fiber link that matches with the first received waveform. For example, $\zeta=0$ in a case that the first received waveform is a CD compensated waveform, and $\zeta=L$ in a case that the first received waveform is a CD uncompensated waveform; the location 0 is a receiving end of the fiber link, the location L is an outputting end of the fiber link. $\hat{D}_{0,z_i}$ represents CD from the location 0 to the predetermined location $z_i$ on the fiber link. $u(0,t)$ represents a normalized linear signal waveform at the location 0, and $u(z_i,t)$ represents the signal part at the predetermined location $z_i$. $\hat{N}_{eRP}$ represents a nonlinear operator based on the eRP model; j is an imaginary unit of a complex number; and S indicates that the first template is generated according to $u(0,t)$.

In some embodiments, the first correlation is represented as: $CR(\Delta E(\zeta,t),\Delta u_{z_i}^S(\zeta,t)) = \gamma P(z_i)L_{CR}(z_i)$.

$CR(A(t),B(t)) \equiv \langle A(t)B^*(t) \rangle$, which represents correlation calculation between A(t) and B(t); $\langle \cdot \rangle$ represents time average operation. $\Delta E(\zeta,t)$ represents the noise part; $\gamma$ represents a nonlinear coefficient. $L_{CR}(z_i)$ is an effective correlation length, $$L_{CR}(z_i) \equiv \int_0^L \frac{P(z)}{P(z_i)}g(z_i-z)dz; g(z_i-z) \equiv CR\left(\Delta u_{z_i}^S(\zeta,t), \Delta u_z^S(\zeta,t)\right)$$

represents a spatial response function. $P(z_i)$ represents the signal power at the predetermined location $z_i$. $P(z)$ represents a signal power at a location z, and the location z is any location on the fiber link.

In some embodiments, the processing circuit 202 is used to: obtain the second template according to the first received waveform, the second template being used for representing a nonlinear noise by a signal and noise waveform at the predetermined location, and the signal and noise waveform at the predetermined location being obtained by the first received waveform; and obtain the second correlation by performing correlation calculation on the noise part and the second template.

In some embodiments, the second template is represented as: $\Delta u_z^{SN}(\zeta,t) = -j\hat{D}_{z_i,\zeta}\hat{N}_{eRP}\hat{D}_{0,z_i}E_{tot}(0,t) = \hat{D}_{z_i,\zeta}[-j(|E_{tot}(z_i,t)|^2-2)E_{tot}(z_i,t)]$.

$\hat{D}_{z_i,\zeta}$ represents CD from the predetermined location $z_i$ to location $\zeta$ on the fiber link, and the location $\zeta$ is any location on the fiber link that matches with the first received waveform. For example, $\zeta=0$ in a case that the first received waveform is a CD compensated waveform, and $\zeta=L$ in a case that the first received waveform is a CD uncompensated waveform; the location 0 is the receiving end of the fiber link, the location L is the outputting end of the fiber link. $\hat{D}_{0,z_i}$ represents CD from the location 0 to the predetermined location $z_i$ on the fiber link. $E_{tot}(0,t)$ represents a signal and noise waveform at the location 0, and $E_{tot}(z_i,t)$ represents the signal and noise waveform at the predetermined location $z_i$. $\hat{N}_{eRP}$ represents a nonlinear operator based on the eRP model; j is an imaginary unit of a complex number; and SN indicates that the second template is generated according to $E_{tot}(0,t)$.

In some embodiments, the second correlation is represented as: $CR(\Delta E(\zeta,t),\Delta u_{z_i}^{SN}(\zeta,t)) = \gamma(P(z_i)+N(z_i))L_{CR}(z_i)$.

$CR(A(t),B(t)) \equiv \langle A(t)B^*(t) \rangle$, which represents correlation calculation between A(t) and B(t); $\langle \cdot \rangle$ represents time average operation. $\Delta E(\zeta,t)$ represents the noise part; $\gamma$ represents a nonlinear coefficient. $L_{CR}(z_i)$ is an effective correlation length, $$L_{CR}(z_i) \equiv \int_0^L \frac{P(z)}{P(z_i)}g(z_i-z)dz; g(z_i-z) \equiv CR\left(\Delta u_{z_i}^{SN}(\zeta,t), \Delta u_z^{SN}(\zeta,t)\right)$$

represents a spatial response function. $P(z)$ represents a signal power at a location z, and the location z is any location on the fiber link. $P(z_i)$ represents the signal power at the predetermined location $z_i$, and $N(z_i)$ represents the noise power at the predetermined location $z_i$.

In some embodiments, the processing circuit 202 is further used to traverse each location on the fiber link to obtain an gOSNR curve of the fiber link; the gOSNR curve takes locations on the fiber link as vertical axis, and takes gOSNRs as horizontal axis.

It should be noted that the specific working processes of interface circuit 201 and processing circuit 202 can refer to the above method embodiments, which will not be repeated here.

Since the method for monitoring gOSNR mentioned above may be applied to the device 20, the device 20 has the same beneficial effects as the method for monitoring gOSNR.

Figure 11A:
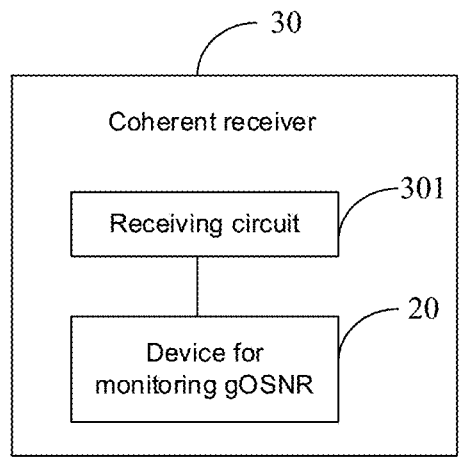
FIG. 11A is a schematic structural diagram of a coherent receiver, in accordance with some embodiments of the present disclosure.

Embodiments of the present disclosure provide a coherent receiver. As shown in FIG. 11A, the coherent receiver 30 includes a receiving circuit 301 and the device 20 for monitoring gOSNR that is coupled to the receiving circuit 301. The receiving circuit 301 is used to couple the fiber link and receive the optical signal transmitted by the fiber link.

Figure 11B:
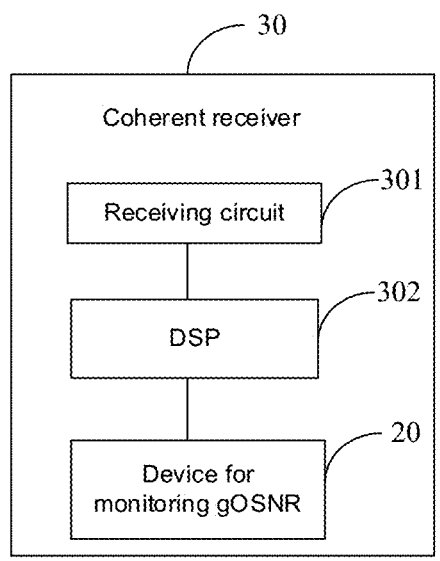
FIG. 11B is a schematic structural diagram of another coherent receiver, in accordance with some embodiments of the present disclosure.

In some examples, as shown in FIG. 11B, the coherent receiver 30 further includes a DSP 302 arranged between the receiving circuit 301 and the device 20. The DSP 302 is used to compensate CD for the second received waveform obtained according to the optical signal to obtain the first received waveform, and then send the first received waveform to the device 20.

For example, the device 20 and the DSP 302 may be integrated together or arranged separately.

Since the coherent receiver 30 provided in the embodiments of the present disclosure includes the device 20, it has the same beneficial effects as the method for monitoring gOSNR.

Figure 12A:
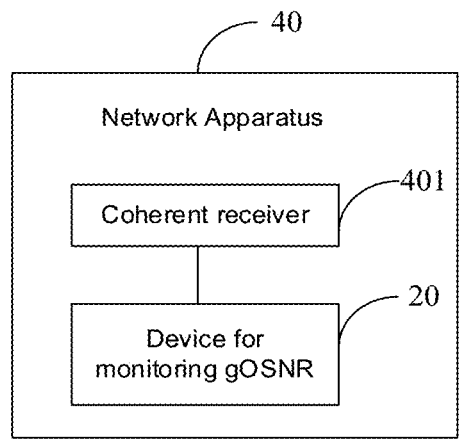
FIG. 12A is a schematic structural diagram of a network apparatus, in accordance with some embodiments of the present disclosure.

Embodiments of the present disclosure provide a network apparatus. As shown in FIG. 12A, the network apparatus 40 includes a coherent receiver 401 and the device 20 for monitoring gOSNR that is coupled to the coherent receiver 401. The coherent receiver 401 is used to couple the fiber link and receive the optical signal transmitted by the fiber link.

Here, the coherent receiver 401 may be a traditional coherent receiver.

Figure 12B:
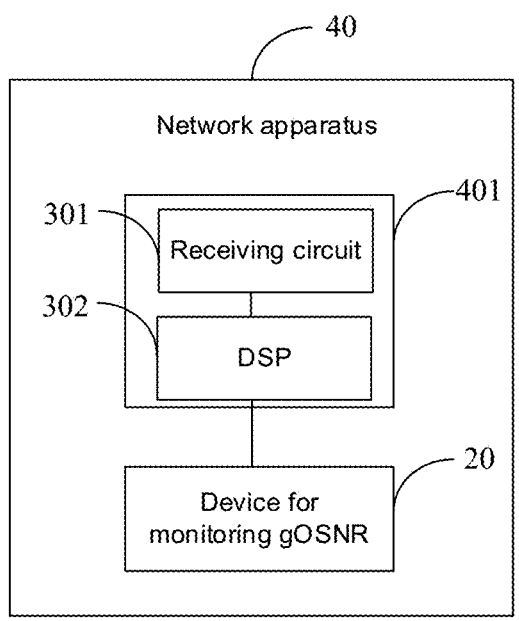
FIG. 12B is a schematic structural diagram of another network apparatus, in accordance with some embodiments of the present disclosure.

In some embodiments, as shown in FIG. 12B, the coherent receiver 401 includes a receiving circuit 301 and a DSP 302. The receiving circuit 301 is coupled to the fiber link, and is used to receive the optical signal transmitted by the fiber link. The DSP 302 is used to compensate CD for the second received waveform obtained according to the optical signal to obtain the first received waveform, and then send the first received waveform to the device 20.

It should be noted that, when the DSP 302 is not available, the device 20 may be coupled to the analog-to-digital converter (ADC) buffer in the coherent receiver 401 to receive ADC buffer data; in this case, the DSP function may be customized inside the device 20.

Figure 12C:
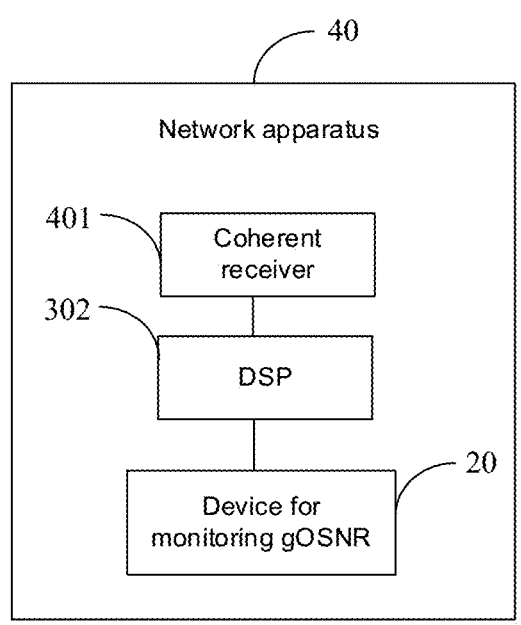
FIG. 12C is a schematic structural diagram of yet another network apparatus, in accordance with some embodiments of the present disclosure.

In some other embodiments, as shown in FIG. 12C, the network apparatus 40 further includes the DSP 302 coupled to the coherent receiver 401 and the device 20. The DSP 302 is used to compensate CD for the second received waveform obtained according to the optical signal to obtain the first received waveform, and then send the first received waveform to the device 20.

Since the network apparatus 40 provided in the embodiments of the present disclosure includes the device 20, it has the same beneficial effects as the method for monitoring gOSNR.

Some embodiments of the present disclosure provide a computer-readable storage medium (e.g., a non-transitory computer-readable storage medium), and the computer-readable storage medium stores therein instructions that, when run on a computer, cause the computer to execute the method for monitoring gOSNR in any of the above embodiments.

For example, the computer-readable storage medium may include, but is not limited to, a magnetic storage device (e.g., a hard disk, a floppy disk or a magnetic tape), an optical disk (e.g., a compact disk, a digital versatile disk (DVD)), a smart card, a flash memory device (e.g., an erasable programmable read-only memory (EPROM), a card, a stick or a key driver). Various computer-readable storage medium described in the present disclosure may represent one or more devices and/or other machine-readable storage medium for storing information. The term "machine-readable storage medium" may include, but is not limited to, wireless channels and various other medium capable of storing, containing and/or carrying instructions and/or data.

Some embodiments of the present disclosure further provide a computer program product. For example, the computer program product is stored on non-transitory computer-readable storage medium. The computer program product includes computer program instructions that, when executed on a computer, cause the computer to perform the method for monitoring gOSNR in any of the above embodiments.

Operations associated with the method described herein can be implemented as coded instructions in the computer program product.

According to the description of the above embodiments, the embodiments of the present disclosure can be implemented only by hardware, or can also be implemented by software and necessary general hardware platforms. Based on the understanding, the technical solution of the present disclosure can be embodied in the form of a software product. The software product can be stored in non-volatile or non-transitory storage media. The non-volatile or non-transitory storage media may be a compact disk read-only memory (CD-ROM), USB flash disk or mobile hard drive. The software product includes instructions that enable a computer device (personal computer, server or network apparatus) to perform the methods provided in embodiments of the present disclosure. Such execution may correspond, for example, to simulation of logical operations as described herein. In accordance with the embodiments of the present disclosure, the software product may additionally or alternatively include instructions that enable the computer device to perform operations of configuring or programming a digital logic device.

The foregoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A method for monitoring generalized optical signal-to-noise ratio (gOSNR), applied to monitoring of an optical signal received by a coherent receiver through a fiber link, comprising:

obtaining a first received waveform, wherein the first received waveform includes a signal part and a noise part;

obtaining the signal part of the first received waveform;

obtaining the noise part of the first received waveform according to the signal part of the first received waveform and the first received waveform;

obtaining a first correlation between the noise part and a first template at a predetermined location on the fiber link, wherein the first correlation indicates a signal power at the predetermined location;

obtaining a second correlation between the noise part and a second template at the predetermined location on the fiber link, wherein the second correlation indicates a signal and noise power at the predetermined location; and obtaining the gOSNR at the predetermined location according to the first correlation and the second correlation.

2. The method according to claim 1, wherein obtaining the first correlation between the noise part and the first template at the predetermined location on the fiber link includes:

obtaining the first template according to the signal part of the first received waveform, wherein the first template is used for representing a nonlinear noise by a signal part at the predetermined location, and the signal part at the predetermined location is obtained by the signal part of the first received waveform; and obtaining the first correlation by performing correlation calculation on the noise part and the first template.

3. The method according to claim 2, wherein for a single-polarization optical signal, the first template is represented as: $\Delta u_{z_i}^S(\zeta,t) = -j\hat{D}_{z_i,\zeta}\hat{N}_{eRP}\hat{D}_{0,z_i}u(0,t) = \hat{D}_{z_i,\zeta}[-j(|u(z_i,t)|^2-2)u(z_i,t)]$;

for a dual-polarization optical signal, the first template includes a first sub-template of x-polarization and a second sub-template of y-polarization; the first sub-template is represented as: $\Delta u_{x,z_i}^S(\zeta,t) = \hat{D}_{z_i,\zeta}[-j(|u_x(z_i,t)|^2+|u_y(z_i,t)|^2-3)u_x(z_i,t)]$; the second sub-template is represented as: $\Delta u_{y,z_i}^S(\zeta,t) = \hat{D}_{z_i,\zeta}[-j(|u_x(z_i,t)|^2+|u_y(z_i,t)|^2-3)u_y(z_i,t)]$;

wherein $\hat{D}_{z_i,\zeta}$ represents chromatic dispersion (CD) from the predetermined location $z_i$ to a location $\zeta$ on the fiber link, and the location $\zeta$ is any location on the fiber link that matches with the first received waveform; $\hat{D}_{0,z_i}$ represents CD from location 0 to the predetermined location $z_i$ on the fiber link; $u(0,t)$ represents a normalized linear signal waveform at the location 0, and $u(z_i,t)$ represents the signal part at the predetermined location $z_i$; $\hat{N}_{eRP}$ represents a nonlinear operator based on an enhanced regular perturbation (eRP) model; j is an imaginary unit of a complex number; and S indicates that the first template is generated according to u(0, t).

4. The method according to claim 3, wherein the first correlation is represented as: $CR(\Delta E(\zeta,t),\Delta u_{z_i}^{S}(\zeta,t))=\gamma P(z_i) L_{CR}(z_i)$, wherein
$CR(A(t),B(t)) \equiv \langle A(t)B^*(t) \rangle$, which represents correlation calculation between A(t) and B(t); $\langle \cdot \rangle$ represents time average operation; $\Delta E(\zeta,t)$ represents the noise part; $\gamma$ represents a nonlinear coefficient; $L_{CR}(z_i)$ is an effective correlation length, $$L_{CR}(z_i) \equiv \int_0^L \frac{P(z)}{P(z_i)} g(z_i-z) dz; g(z_i-z) \equiv CR\left(\Delta u_{z_i}^S(\zeta,t), \Delta u_z^S(\zeta,t)\right)$$

represents a spatial response function; $P(z_i)$ represents the signal power at the predetermined location $z_i$; P(z) represents a signal power at a location z, and the location z is any location on the fiber link.

5. The method according to claim 1, wherein obtaining the second correlation between the noise part and the second template at the predetermined location on the fiber link includes:
  obtaining the second template according to the first received waveform, wherein the second template is used for representing a nonlinear noise by a signal and noise waveform at the predetermined location, and the signal and noise waveform at the predetermined location is obtained by the first received waveform; and
  obtaining the second correlation by performing correlation calculation on the noise part and the second template.

6. The method according to claim 5, wherein the second template is represented as: $\Delta u_{z_i}^{SN}(\zeta,t)=-j\hat{D}_{z_i,\zeta}\hat{N}_{eRP}\hat{D}_{0,z_i}E_{tot}(0,t)=\hat{D}_{z_i,\zeta}[-j(|E_{tot}(z_i,t)|^2-2)E_{tot}(z_i,t)]$;
  wherein $\hat{D}_{z_i,\zeta}$ represents chromatic dispersion (CD) from the predetermined location $z_i$ to a location $\zeta$ on the fiber link, and the location $\zeta$ is any location on the fiber link that matches with the first received waveform; $\hat{D}_{0,z_i}$ represents CD from location 0 to the predetermined location $z_i$ on the fiber link; $E_{tot}(0,t)$ represents a signal and noise waveform at the location 0, and $E_{tot}(z_i,t)$ represents the signal and noise waveform at the predetermined location $z_i$; $\hat{N}_{eRP}$ represents a nonlinear operator based on an enhanced regular perturbation (eRP) model; j is an imaginary unit of a complex number; and SN indicates that the second template is generated according to $E_{tot}(0,t)$.

7. The method according to claim 6, wherein the second correlation is represented as: $CR(\Delta E(\zeta,t),\Delta u_{z_i}^{SN}(\zeta,t))=\gamma(P(z_i)+N(z_i))L_{CR}(z_i)$, wherein
$CR(A(t),B(t)) \equiv \langle A(t)B^*(t) \rangle$, which represents correlation calculation between A(t) and B(t); $\langle \cdot \rangle$ represents time average operation; $\Delta E(\zeta,t)$ represents the noise part; $\gamma$ represents a nonlinear coefficient; $L_{CR}(z_i)$ is an effective correlation length, $$L_{CR}(z_i) \equiv \int_0^L \frac{P(z)}{P(z_i)} g(z_i-z) dz; g(z_i-z) \equiv CR\left(\Delta u_{z_i}^{SN}(\zeta,t), \Delta u_z^{SN}(\zeta,t)\right)$$

represents a spatial response function; $P(z_i)$ represents the signal power at the predetermined location $z_i$, and $N(z_i)$ represents the noise power at the predetermined location $z_i$; P(z) represents a signal power at a location z, and the location z is any location on the fiber link.

8. The method according to claim 1, further comprising:
  traversing each location on the fiber link to obtain a gOSNR curve of the fiber link, wherein the gOSNR curve takes locations on the fiber link as vertical axis, and takes the gOSNRs as horizontal axis.

9. The method according to claim 1, wherein obtaining the first received waveform includes:
  receiving a signal waveform sent by the coherent receiver as the first received waveform; or
  receiving a second received waveform sent by the coherent receiver; and
  performing chromatic dispersion (CD) compensation on the second received waveform to obtain the first received waveform.

10. A device for monitoring generalized optical signal-to-noise ratio (gOSNR), applied to monitoring of an optical signal received by a coherent receiver through a fiber link, comprising:
  an interface circuit, wherein the interface circuit is used to obtain a first received waveform, and the first received waveform includes a signal part and a noise part; and
  a processing circuit coupled to the interface circuit, wherein the processing circuit is used to: obtain the signal part of the first received waveform; obtain the noise part of the first received waveform according to the signal part of the first received waveform and the first received waveform; obtain a first correlation between the noise part and a first template at a predetermined location on the fiber link, the first correlation indicating a signal power at the predetermined location; obtain a second correlation between the noise part and a second template at the predetermined location on the fiber link, the second correlation indicating a signal and noise power at the predetermined location; and obtain the gOSNR at the predetermined location according to the first correlation and the second correlation.

11. The device according to claim 10, wherein the processing circuit is used to: obtain the first template according to the signal part of the first received waveform, the first template being used for representing a nonlinear noise by a signal part at the predetermined location, and the signal part at the predetermined location being obtained by the signal part of the first received waveform; and obtain the first correlation by performing correlation calculation on the noise part and the first template.

12. The device according to claim 11, wherein for a single-polarization optical signal, the first template is represented as: $\Delta u_{z_i}^{S}(\zeta,t)=-j\hat{D}_{z_i,\zeta}\hat{N}_{eRP}\hat{D}_{0,z_i}u(0,t)=\hat{D}_{z_i,\zeta}[-j(|u(z_i,t)|^2-2)u(z_i,t)]$;
  for a dual-polarization optical signal, the first template includes a first sub-template of x-polarization and a second sub-template of y-polarization; the first sub-template is represented as: $\Delta u_{x,z_i}^{S}(\zeta,t)=\hat{D}_{z_i,\zeta}[-j(|u_x(z_i,t)|^2+|u_y(z_i,t)|^2-3)u_x(z_i,t)]$; the second sub-template is represented as: $\Delta u_{y,z_i}^{S}(\zeta,t)=\hat{D}_{z_i,\zeta}[-j(|u_x(z_i,t)|^2+|u_y(z_i,t)|^2-3)u_y(z_i,t)]$;
  wherein $\hat{D}_{z_i,\zeta}$ represents chromatic dispersion (CD) from the predetermined location $z_i$ to a location $\zeta$ on the fiber link, and the location $\zeta$ is any location on the fiber link that matches with the first received waveform; $\hat{D}_{0,z_i}$ represents CD from location 0 to the predetermined location $z_i$ on the fiber link; u(0,t) represents a normalized linear signal waveform at the location 0, and $u(z_i,t)$ represents the signal part at the predetermined location $z_i$; $\hat{N}_{eRP}$ represents a nonlinear operator based on an enhanced regular perturbation (eRP) model; j is an imaginary unit of a complex number; and S indicates that the first template is generated according to u(0,t).

13. The device according to claim 12, wherein the first correlation is represented as: $CR(\Delta E(\zeta,t),\Delta u_{z_i}^S(\zeta,t))=\gamma P(z_i) L_{CR}(z_i)$, wherein $CR(A(t),B(t))\equiv \langle A(t)B^*(t)\rangle$, which represents correlation calculation between $A(t)$ and $B(t)$; $\langle \cdot \rangle$ represents time average operation; $\Delta E(\zeta,t)$ represents the noise part; $\gamma$ represents a nonlinear coefficient; $L_{CR}(z_i)$ is an effective correlation length, $$L_{CR}(z_i) \equiv \int_0^L \frac{P(z)}{P(z_i)} g(z_i - z) dz;\ g(z_i - z) \equiv CR\left(\Delta u_{z_i}^S(\zeta, t), \Delta u_z^S(\zeta, t)\right)$$

represents a spatial response function; $P(z_i)$ represents the signal power at the predetermined location $z_i$; $P(z)$ represents a signal power at a location $z$, and the location $z$ is any location on the fiber link.

14. The device according to claim 10, wherein the processing circuit is used to: obtain the second template according to the first received waveform, the second template being used for representing a nonlinear noise by a signal and noise waveform at the predetermined location, and the signal and noise waveform at the predetermined location being obtained by the first received waveform; and obtain the second correlation by performing correlation calculation on the noise part and the second template.

15. The device according to claim 14, wherein the second template is represented as:
$\Delta u_{z_i}^{SN}(\zeta,t)=-j\hat{D}_{z_i,\zeta}\hat{N}_{eRP}\hat{D}_{0,z_i}E_{tot}(0,t)=\hat{D}_{z_i,\zeta}[-j(|E_{tot}(z_i,t)|^2-2)E_{tot}(z_i,t)]$;
wherein $\hat{D}_{z_i,\zeta}$ represents chromatic dispersion (CD) from the predetermined location $z_i$ to a location $\zeta$ on the fiber link, and the location $\zeta$ is any location on the fiber link that matches with the first received waveform; $\hat{D}_{0,z_i}$ represents CD from location 0 to the predetermined location $z_i$ on the fiber link; $E_{tot}(0,t)$ represents a signal and noise waveform at the location 0, and $E_{tot}(z_i,t)$ represents the signal and noise waveform at the predetermined location $z_i$; $\hat{N}_{eRP}$ represents a nonlinear operator based on an enhanced regular perturbation (eRP) model; j is an imaginary unit of a complex number; and SN indicates that the second template is generated according to $E_{tot}(0,t)$.

16. The device according to claim 15, wherein the second correlation is represented as: $CR(\Delta E(\zeta,t),\Delta u_{z_i}^{SN}(\zeta,t))=\gamma(P(z_i)+N(z_i))L_{CR}(z_i)$, wherein
$CR(A(t),B(t))\equiv \langle A(t)B^*(t)\rangle$, which represents correlation calculation between $A(t)$ and $B(t)$; $\langle \cdot \rangle$ represents time average operation; $\Delta E(\zeta,t)$ represents the noise part; $\gamma$ represents a nonlinear coefficient; $L_{CR}(z_i)$ is an effective correlation length, $$L_{CR}(z_i) \equiv \int_0^L \frac{P(z)}{P(z_i)} g(z_i - z) dz;\ g(z_i - z) \equiv CR\left(\Delta u_{z_i}^{SN}(\zeta, t), \Delta u_z^{SN}(\zeta, t)\right)$$

represents a spatial response function; $P(z_i)$ represents the signal power at the predetermined location $z_i$ and $N(z_i)$ represents the noise power at the predetermined location $z_i$; $P(z)$ represents a signal power at a location $z$, and the location $z$ is any location on the fiber link.

17. The device according to claim 10, wherein the processing circuit is further used to traverse each location on the fiber link to obtain a gOSNR curve of the fiber link; the gOSNR curve takes locations on the fiber link as vertical axis, and takes the gOSNRs as horizontal axis.

18. A coherent receiver, comprising:
a receiving circuit used for coupling a fiber link and receiving an optical signal transmitted by the fiber link; and
a device for monitoring generalized optical signal-to-noise ratio (gOSNR), applied to monitoring of the optical signal received by the coherent receiver through the fiber link, the device being coupled to the coherent receiver, the device comprising:
an interface circuit, wherein the interface circuit is used to obtain a first received waveform, and the first received waveform includes a signal part and a noise part; and
a processing circuit coupled to the interface circuit, wherein the processing circuit is used to: obtain the signal part of the first received waveform; obtain the noise part of the first received waveform according to the signal part of the first received waveform and the first received waveform; obtain a first correlation between the noise part and a first template at a predetermined location on the fiber link, the first correlation indicating a signal power at the predetermined location; obtain a second correlation between the noise part and a second template at the predetermined location on the fiber link, the second correlation indicating a signal and noise power at the predetermined location; and obtain the gOSNR at the predetermined location according to the first correlation and the second correlation.

19. A network apparatus, comprising:
a coherent receiver used for coupling a fiber link and receiving an optical signal transmitted by the fiber link; and
a device for monitoring generalized optical signal-to-noise ratio (gOSNR), applied to monitoring of the optical signal received by the coherent receiver through the fiber link, the device being coupled to the coherent receiver, the device comprising:
an interface circuit, wherein the interface circuit is used to obtain a first received waveform, and the first received waveform includes a signal part and a noise part; and
a processing circuit coupled to the interface circuit, wherein the processing circuit is used to: obtain the signal part of the first received waveform; obtain the noise part of the first received waveform according to the signal part of the first received waveform and the first received waveform; obtain a first correlation between the noise part and a first template at a predetermined location on the fiber link, the first correlation indicating a signal power at the predetermined location; obtain a second correlation between the noise part and a second template at the predetermined location on the fiber link, the second correlation indicating a signal and noise power at the predetermined location; and obtain the gOSNR at the predetermined location according to the first correlation and the second correlation.

20. The network apparatus according to claim 19, wherein the coherent receiver includes a receiving circuit and a digital signal processor (DSP); the receiving circuit is coupled to the fiber link for receiving the optical signal transmitted by the fiber link; the DSP is used to compensate chromatic dispersion (CD) for a second received waveform obtained according to the optical signal to obtain the first received waveform, and then send the first received waveform to the device; or
the network apparatus further comprises the DSP coupled to the coherent receiver and the device; and the DSP is used to compensate the CD for the second received waveform obtained according to the optical signal to obtain the first received waveform, and then send the first received waveform to the device.

* * * * *

UNITED STATES PATENT AND TRADEMARK OFFICE
CERTIFICATE OF CORRECTION

PATENT NO. : 12,476,712 B2  
APPLICATION NO. : 18/464825  
DATED : November 18, 2025  
INVENTOR(S) : Jiang et al.

Page 1 of 1

It is certified that error appears in the above-identified patent and that said Letters Patent is hereby corrected as shown below:

In the Claims

In Column 23, Claim 16, Line 61, delete "$z_i$" and insert -- $z_i$, --.

Signed and Sealed this  
Sixth Day of January, 2026

John A. Squires  
*Director of the United States Patent and Trademark Office*